US010176976B2

(12) United States Patent
Rohner

(10) Patent No.: US 10,176,976 B2
(45) Date of Patent: Jan. 8, 2019

(54) ION SOURCE AND METHOD FOR GENERATING ELEMENTAL IONS FROM AEROSOL PARTICLES

(71) Applicant: TOFWERK AG, Thun (CH)

(72) Inventor: Urs Rohner, Thun (CH)

(73) Assignee: TOFWERK AG, Thun (CH)

( * ) Notice: Subject to any disclaimer, the term of this patent is extended or adjusted under 35 U.S.C. 154(b) by 0 days.

(21) Appl. No.: 15/857,897

(22) Filed: Dec. 29, 2017

(65) Prior Publication Data

US 2018/0294149 A1 Oct. 11, 2018

(30) Foreign Application Priority Data

Apr. 10, 2017 (EP) .................................... 17165739

(51) Int. Cl.
*H01J 49/16* (2006.01)
*H01J 49/40* (2006.01)
(Continued)

(52) U.S. Cl.
CPC .......... *H01J 49/0445* (2013.01); *H01J 49/14* (2013.01)

(58) Field of Classification Search
USPC ......... 250/281, 282, 286–289, 423 R, 423 P, 250/424, 526
See application file for complete search history.

(56) References Cited

U.S. PATENT DOCUMENTS 5,681,752 A 10/1997 Prather
5,995,989 A * 11/1999 Gedcke ............... H01J 49/0036 708/203

(Continued)

OTHER PUBLICATIONS

Anonymous: "Aerosol Mass Spectrometer Options", Jun. 18, 2014, pp. 1-2.

(Continued)

*Primary Examiner* — Bernard Souw
(74) *Attorney, Agent, or Firm* — Birch, Stewart, Kolasch & Birch, LLP

(57) ABSTRACT

The invention relates to an ion source (50) for generating elemental ions and/or ionized metal oxides from aerosol particles, comprising: a reduced pressure chamber (61) having an inside; an inlet (56) and a flow restricting device (60) for inserting the aerosol particles in a dispersion comprising the aerosol particles dispersed in a gas, in particular in air, into the inside of the reduced pressure chamber (61), the inlet (60) fluidly coupling an outside of the reduced pressure chamber (61) via the flow restricting device (60) with the inside of the reduced pressure chamber (60); a laser (62) for inducing in a plasma region (63) in the inside of the reduced pressure chamber (61) a plasma in the dispersion for atomizing and ionizing the aerosol particles to elemental ions and/or ionized metal oxides; wherein the reduced pressure chamber (61) is adapted for achieving and maintaining in the inside of the reduced pressure chamber (61) a pressure in a range from 0.01 mbar to 100 mbar. The invention further relates to a method for generating elemental ions and/or ionized metal oxides from aerosol particles, comprising the steps of inserting aerosol particles in a dispersion comprising the aerosol particles dispersed in a gas, in particular in air, through an inlet (56) via a flow restricting device (60) into an inside of a reduced pressure chamber (61), while maintaining in the inside of the reduced pressure chamber (61) a pressure in a range from 0.01 mbar to 100 mbar, preferably from 0.1 mbar to 100 mbar or from 1 mbar to 100 mbar, particular preferably from 0.1 mbar to 50 mbar or from 1 mbar to 50 mbar, most preferably from 0.1 mbar to 40 mbar or from 1 mbar to 40 mbar; and inducing with a laser (62) in a plasma region (63) in the inside of the reduced pressure chamber (61) a plasma in the dispersion for atomizing and ionizing the aerosol particles to elemental ions and/or ionized metal oxides, wherein the (Continued)

laser (62) is adapted for inducing in the plasma region (63) in the inside of the reduced pressure chamber (61) the plasma in the gas of the dispersion for atomizing and ionizing the aerosol particles to elemental ions.

15 Claims, 3 Drawing Sheets

(51) Int. Cl.

| | |
|---|---|
| ***B01D 59/44*** | (2006.01) |
| ***H01J 49/04*** | (2006.01) |
| ***H01J 49/14*** | (2006.01) |

(56) References Cited

U.S. PATENT DOCUMENTS

| | | | | |
|---|---|---|---|---|
| 6,506,493 | B1 * | 1/2003 | Kumar | B82Y 30/00 428/402 |
| 6,680,041 | B1 * | 1/2004 | Kumar | B82Y 30/00 423/605 |
| 8,648,294 | B2 | 2/2014 | Prather et al. | |
| 2005/0270191 | A1 * | 12/2005 | Hofstadler | G01N 33/6848 341/50 |
| 2006/0192111 | A1 * | 8/2006 | Fuhrer | H01J 49/0036 250/288 |
| 2009/0175766 | A1 * | 7/2009 | deCorral | G01N 30/8651 422/70 |
| 2010/0252731 | A1 | 10/2010 | Reilly | |
| 2012/0126110 | A1 * | 5/2012 | Green | G06K 9/0053 250/282 |
| 2015/0235833 | A1 | 8/2015 | Bazargan et al. | |
| 2017/0110305 | A1 * | 4/2017 | Gonin | H01J 49/0036 |

OTHER PUBLICATIONS

Eichler et al. "A novel inlet system for online chemical analysis of semi-volatile submicron particulate matter", Atmos, Mens. Tech., vol. 8, No. 3, Mar. 20, 2015, p. 1353-1360.

Eyglunent et al. "Simple and Reversible Transformation of an APCI/MS/MS Into an Aerosol Mass Spectrometer: Development and Characterization of a New Inlet", Aerosol Science and Technology, vol. 42, No. 3, Jan. 24, 2008, p. 182-193.

Lopez-Hilfiker et al. "Charaterization of a New Extractive Electrospray Ionization (EESI) Source for Online Particle Analysis and its Application to Atmospheric Aersosol", Poster presented at DGMS 2017 Conference in Kiel, Germany, Mar. 8, 2017.

* cited by examiner

ION SOURCE AND METHOD FOR GENERATING ELEMENTAL IONS FROM AEROSOL PARTICLES

TECHNICAL FIELD

The invention relates to an ion source for generating elemental ions and possible ionised metal oxides from aerosol particles, comprising a reduced pressure chamber having an inside, an inlet and a flow restricting device for inserting the aerosol particles in a dispersion comprising the aerosol particles dispersed in a gas, in particular in air, into the inside of the reduced pressure chamber, the inlet fluidly coupling an outside of the reduced pressure chamber via said flow restricting device with the inside of the reduced pressure chamber and a laser for inducing in a plasma region in the inside of the reduced pressure chamber a plasma in the dispersion for atomising and ionising the aerosol particles to elemental ions and possible ionised metal oxides. Furthermore, the invention relates to a method for generating elemental ions and possible ionised metal oxides from aerosol particles.

BACKGROUND ART

Aerosols are the gaseous suspension of fine solid or liquid particles which are also called aerosol particles. In such suspensions, gas and aerosol particles interact with each other in the sense that gaseous substances can condense on the surface of the aerosol particles while simultaneously liquid or solid substances can evaporate from the aerosol particles surface into the gas phase. The equilibrium between the gas and the particle phase is largely driven by the individual compound's saturation vapour pressure.

Aerosol particles usually have a size in a range from 10 nm to 10 μm. Aerosol particles smaller than 10 nm have a large surface to size ratio and therefore grow quickly into larger aerosol particles. Aerosol particles larger than 10 μm on the other hand become too heavy to be suspended in gas for a long time and will eventually fall to the ground. For this reason, the typical size range of ambient aerosol particles is from 50 nm to 2000 nm or 2 μm, respectively.

Methods and an apparatus for analysing the elemental composition of aerosol particles, especially for detecting the elemental compounds of aerosol particles, like metals and black carbon, are known. For example, they are used for analysing anthropogenic (man-made) aerosols and aerosol particles containing trace amounts of metals like for example engineered nanoparticles. They are also used for nanoparticle analysis, since nanoparticles usually consist of a large fraction of metals. Thus, they are employed in atmospheric science, but also nuclear forensics, nanoparticle analysis, environmental analysis like water and air monitoring or quality assurance of food and beverages.

Sampling aerosol particles has traditionally been done using filters or swabs. In this approach, the aerosol particles are collected on filters or swabs and later analysed in an off-line procedure. Over the last 30 years however, several instruments have been developed for analysing the elemental composition of aerosol particles on-line and in real-time. Most of these instruments rely on sampling air directly into an ion source where the aerosol particles are atomised and ionised and then fed from the ion source to a mass analyser. When sampling the air directly into the ion source, most of these ionisations sources first separate the gas phase from the particle phase in several differentially pumped stages whereby the gas phase is diluted by a factor of roughly $10^{10}$ by bringing the aerosol particles from atmospheric pressure (approximately 1000 mbar) into a high vacuum or ultra-high-vacuum with a pressure of approximately $10^{-7}$ mbar.

Subsequently, the aerosol particles are hit by a laser beam to desorb molecules and atoms from the aerosol particles, and to ionize the molecules or atoms. Upon the laser irradiation, the aerosol particles evaporate and ionize, creating a plasma from the aerosol particle material. If the plasma is hot enough, atomisation occurs and elemental ions can be measured. This class of instruments is usually referred to as aerosol time-of-flight mass spectrometers (ATOFMS).

Multiple versions of such instruments with ion sources which use one or several lasers for vaporising the aerosol particles as well as for ionizing the vaporized substances under high vacuum are for example taught in U.S. Pat. No. 5,681,752 of Kimberley or in U.S. Pat. No. 8,648,294 B2 of Kimberley et al.

These instruments are rather compact and field deployable. However, they have the disadvantage that they require a high vacuum or ultra-high vacuum and are thus extensive and complex equipment. Additionally, they do not allow for measurements with a high precision and reliability because the atomisation and ionisation of the aerosol particles is not very reproducible. One limiting factor of the reproducibility is that the atomisation and ionisation of the aerosol particles depends on the size and the chemical composition of the aerosol particles and on the structure and the surface structure of the aerosol particles. Another limiting factor of the reproducibility is that the type of ions obtained from a specific aerosol particle depends to a large extent on the interaction of the laser beam with the respective aerosol particle. When being ionised, the respective aerosol particle can for example be localised in the fringe region of the laser beam or in the centre region of the laser beam. Depending on this localisation, the obtained ions may range from ions of particle fragments comprising several or numerous atoms to elemental ions comprising only single atoms. One way to reduce these disadvantages is to often re-adjust the laser optics. However, this results in a considerable complication of the equipment's maintenance.

Another way to produce elemental ions from aerosol particles is to use an ion source which uses a gas plasma, e.g. an inductively coupled plasma (ICP) or a microwave induced plasma (MIP) created in a clean plasma gas which is typically argon. In this case, the aerosol particles are desorbed, atomised and ionised in the plasma. Subsequently, the obtained elemental ions are transferred from the ion source to a mass analyser. Since in these ion sources, the plasma is generated independent of the aerosol particles, it is much more reproducible and therefore a more reliable and more reproducible production of elemental ions is enabled.

However, in this approach, the gas phase of the original gaseous suspension of aerosol particles must be exchanged with a clean gas in order to avoid background from gaseous contaminants. This approach is taken in a technique called single particle inductively coupled plasma mass spectrometry (SI-ICP-MS) as taught for example in US 2015/0235833 A1 of Bazargan et al. There, the aerosol particles are transferred from the original gas phase either into a liquid or into a clean gas. The latter is done with a "gas exchange device" as described by J. Anal. At. Spectrom., 2013, 28, 831-842; DOI: 10.1039/C3JA50044F or J-SCIENCE LAB, Kyoto, Japan. Another, even more severe downside of such ion sources and methods for generating elemental ions from aerosol particles is their complexity and need for large amounts of plasma gas supply and large amounts of energy to power the plasma. Consequently, these ion sources and method are not suited for monitoring applications or field applications.

For the reasons mentioned above, the known ion sources and methods for generating elemental ions from aerosol particles have the disadvantage that they either do not enable an efficient and reliable production of elemental ions or require extensive equipment. As a consequence, the known apparatus' and methods for analysing an elemental composition of aerosol particles relying on such ion sources and methods for generating elemental ions from aerosol particles cannot provide reliable and precise results and at the same time be flexibly used for different types of analyses of the elemental composition of aerosol particles, like for example required for on-line and real-time analysis in monitoring applications or field applications.

SUMMARY OF THE INVENTION

The object of the invention is to create an ion source and a method for generating elemental ions from aerosol particles suitable for an apparatus and a method for analysing the elemental composition of aerosol particles pertaining to the technical field initially mentioned that enables precise and reliable analysis of the elemental composition of aerosol particles and which can be employed for different types of analysis of the elemental composition of aerosol particles, like for example on-line and real-time analysis in monitoring applications or field applications.

The solution of the invention is specified by the features of claim 1. According to the invention, the reduced pressure chamber is adapted for achieving and maintaining in the inside of the reduced pressure chamber a pressure in a range from 0.01 mbar to 100 mbar, preferably from 0.1 mbar to 100 mbar or from 1 mbar to 100 mbar, particular preferably from 0.1 mbar to 50 mbar or from 1 mbar to 50 mbar, most preferably from 0.1 mbar to 40 mbar or from 1 mbar to 40 mbar. If the pressure in the inside of the reduced pressure chamber is too small, there are not enough gas molecules per volume unit for inducing in the plasma region in the inside of the reduced pressure chamber the plasma in the gas of the dispersion for atomising and ionising the aerosol particles to elemental ions. If the pressure in the inside of the pressure chamber is too high however, shock waves in the gas and possibly plasma occur which do not fully atomise and ionise the aerosol particles to elemental ions such that molecular ions or even uncharged fragments are obtained instead of elemental ions. Therefore, the higher the lower limit of the range of the pressure in the inside of the reduced pressure chamber is, the more reliable the plasma can be induced with the laser in the gas of the dispersion in the plasma region in the inside of the reduced pressure chamber for atomising and ionising the aerosol particles to elemental ions. Consequently, inducing the plasma becomes more reliable as the lower limit of the range of the pressure is increased from the above indicated 0.01 mbar to the above indicated 0.1 mbar or even the above indicated 1 mbar, respectively. Furthermore, the lower the upper limit of the range of the pressure in the inside of the reduced pressure chamber is, the more reliable it is to obtain a large fraction or even exclusively elemental ions. Consequently, obtaining elemental ions becomes more reliable as the upper limit of the range of the pressure is decreased from the above indicated 100 mbar to the above indicated 50 mbar or even the above indicated 40 mbar, respectively.

The reduced pressure chamber is a chamber which separates its inside from an outside of the chamber and which enables to achieve and maintain in its inside a gas pressure which is reduced as compared to the atmospheric pressure. In a preferred embodiment, the reduced pressure chamber comprises means for achieving and maintaining in the inside of the reduced pressure chamber a pressure in a range from 0.01 mbar to 100 mbar, preferably from 0.1 mbar to 100 mbar or from 1 mbar to 100 mbar, particular preferably from 0.1 mbar to 50 mbar or from 1 mbar to 50 mbar, most preferably from 0.1 mbar to 40 mbar or from 1 mbar to 40 mbar. However, the reduced pressure chamber may go without such a means for achieving and maintaining in the inside of the reduced pressure chamber a pressure in a range from 0.01 mbar to 100 mbar, from 0.1 mbar to 100 mbar, from 1 mbar to 100 mbar, from 0.1 mbar to 50 mbar from 1 mbar to 50 mbar, from 0.1 mbar to 40 mbar or from 1 mbar to 40 mbar, respectively. In this case, the reduced pressure chamber may for example be connectable to a separate means for achieving and maintaining in the inside of the reduced pressure chamber a pressure in a range from 0.01 mbar to 100 mbar, from 0.1 mbar to 100 mbar, from 1 mbar to 100 mbar, from 0.1 mbar to 50 mbar, from 1 mbar to 50 mbar, from 0.1 mbar to 40 mbar or from 1 mbar to 40 mbar, respectively. Since the aerosol particles are atomised and ionised by the laser into elemental ions and possible ionised metal oxides in the inside of the reduced pressure chamber, the reduced pressure chamber can also be referred to as ionisation chamber.

For the solution according to the invention, it is not of further relevance how the means for achieving and maintaining the required pressure in the inside of the reduced pressure chamber is designed and constructed. There are many kinds of means for achieving and maintaining such a pressure known to the person skilled in the art. For example, the means may be a vacuum pump of the type of a turbo pump with or without backing pump, a scroll pump, a screw pump, a rotary vane pump or any other type of vacuum pump. Instead of a vacuum pump it may as well be some other means for obtaining and maintaining the required pressure in the inside of the reduced pressure chamber. The best choice of the means depends to a large extent on the capacity required for reducing and maintaining the required gas pressure inside the reduced pressure chamber. This required capacity depends itself on the precise pressure to be achieved and maintained in the inside of the reduced pressure chamber and on the amount of dispersion which is inserted by the flow restricting device into the inside of the reduced pressure chamber per time unit as well as on how many ions are removed from the inside of the reduced pressure chamber per time unit for the analysis of the ions by the first mass analyser. Besides the fact that the means for achieving and maintaining the desired pressure in the inside of the reduced pressure chamber should provide at least the required capacity, it should preferably not introduce oil dust or any other contaminants into the inside of the reduced pressure chamber.

For the solution according to the invention, it is not of further relevance how the flow restricting device is designed and constructed in detail, as long as it limits the flow of the gas in the dispersion comprising the aerosol particles dispersed in a gas into the inside of the reduced pressure chamber. Preferably, the flow restricting device provides at least one stage comprising a plate with an orifice which reduces the flow through the flow restricting device. Particularly preferably, the flow restricting device provides at least two or at least three stages, wherein the stages are arranged in series and wherein each stage comprises a plate with an orifice which reduces the flow through the respective orifice and thus through the flow restricting device. However, the flow restricting device may be constructed differently, too. For example, the flow restricting device may comprise capillaries through which the dispersion is directed. In other examples, the flow restricting device may be constructed in the form of a particle lens or the flow restricting device may comprise a needle valve for adjusting the flow of the gas in the dispersion comprising the aerosol particles dispersed in a gas into the inside of the reduced pressure chamber.

Since the flow restricting device fluidly couples the outside of the reduced pressure chamber with the inside of the reduced pressure chamber, the dispersion can flow through the flow restricting device and thus be inserted into the inside of the reduced pressure chamber. Since the flow through the flow restricting device is limited, a pressure in the range from 0.01 mbar to 100 mbar, from 0.1 mbar to 100 mbar, from 1 mbar to 100 mbar, from 0.1 mbar to 50 mbar, from 1 mbar to 50 mbar, from 0.1 mbar to 40 mbar or from 1 mbar to 40 mbar, respectively, can be achieved and maintained in the inside of the reduced pressure chamber.

According to the invention, the ion source comprises a laser for inducing in a plasma region in the inside of the reduced pressure chamber a plasma in the dispersion for atomising and ionising the aerosol particles to ions. Thereby, the ion source may comprise exactly one laser for inducing in the plasma region in the inside of the reduced pressure chamber a plasma in the dispersion for atomising and ionising the aerosol particles to ions, or the ion source may comprise more than one laser, like for example two, three or even more lasers for inducing in the plasma region in the inside of the reduced pressure chamber a plasma in the dispersion for atomising and ionising the aerosol particles to ions. Independent of the number of lasers, by the atomisation and ionisation of the aerosol particles, elemental ions comprising only single atoms are obtained. However, some of the obtained debris of the aerosol particles may not be elemental ions but be ionised or non-ionised fragments of the respective aerosol particle comprising several or numerous atoms. Furthermore, some metal atoms possibly comprised in the aerosol particles become atomised and ionised to elemental ions. However, some of these metal atoms may either become atomised and oxidised by the gas of the dispersion inserted into the reduced pressure chamber to metal oxides and ionised to ionised metal oxides or atomised and ionised and oxidised by the gas of the dispersion inserted into the inside of the reduced pressure chamber to ionised metal oxides. More specifically, in case the aerosol particles comprise metal atoms, the fraction of metal atoms which become ionised metal oxides instead of elemental ions depends to a large extent on the gas in the dispersion which is inserted into the inside of the reduced pressure chamber, on the pressure in the plasma region and on how reactive this gas is with the specific metal. As described below in more detail, one can increase the fraction of elemental ions by choosing a specific gas in the dispersion which is inserted into the inside of the reduced pressure chamber. Furthermore, as described below in more detail, one can increase the fraction of elemental ions by breaking ionised metal oxides generated by the laser up into elemental ions. Independent on possible metals in the aerosol particles, the percentage of elemental ions and ionised metal oxides amongst the total amount of obtained ions is high. Preferably, this percentage is larger than 80% or even larger than 90%. Particular preferably, this percentage is larger than 95% or even larger than 98%.

The method according to the invention comprises the steps of inserting aerosol particles in a dispersion comprising the aerosol particles dispersed in a gas, in particular in air, through the flow restricting device into the inside of the reduced pressure chamber, while maintaining in the inside of the reduced pressure chamber a pressure in a range from 0.01 mbar to 100 mbar, preferably from 0.1 mbar to 100 mbar or from 1 mbar to 100 mbar, particular preferably from 0.1 mbar to 50 mbar or from 1 mbar to 50 mbar, most preferably from 0.1 mbar to 40 mbar or from 1 mbar to 40 mbar, and inducing with a laser in a plasma region in the inside of the reduced pressure chamber a plasma in the dispersion for atomising and ionising the aerosol particles to elemental ions and possible ionised metal oxides. Thereby, the plasma is advantageously induced with the laser in the gas of the dispersion inserted into the inside of the reduced pressure chamber.

In a first preferred variant, the above indicated pressure in the range from 0.01 mbar to 100 mbar, from 0.1 mbar to 100 mbar, from 1 mbar to 100 mbar, from 0.1 mbar to 50 mbar, from 1 mbar to 50 mbar, from 0.1 mbar to 40 mbar, from 1 mbar to 40 mbar, respectively refers to the pressure determined at a measurement position in the inside of the reduced pressure chamber which is distanced from where the dispersion is insertable into the inside of the reduced pressure chamber by the flow restricting device. The reason for this preferred measurement position is that in a region where the dispersion which is inserted into the inside of the reduced pressure chamber, the dispersion is expanding into the reduced pressure chamber. Thus, the pressure in the inside of the reduced pressure chamber is inhomogeneous. Since the dispersion is inserted in a confined volume into the inside of the reduced pressure chamber by the flow restricting device, while the inside of the reduced pressure chamber is larger volume than this confined volume, a gradient of the pressure within the inside of the reduced pressure chamber decreases with distance from where the dispersion is inserted into the inside of the reduced pressure chamber. For this reason, the measurement position is preferably located in the inside of the reduced pressure chamber where the gradient of the pressure is less than 10%, preferably less than 5%, particular preferably less than 2% of the maximum gradient of the pressure in the region where the dispersion which is inserted into the inside of the reduced pressure chamber is expanding into the reduced pressure chamber. In this particular location of the measurement position, the pressure is advantageously in the above indicated range from 0.01 mbar to 100 mbar or in a range from 0.01 mbar to 10 mbar, particular advantageously in a range from 0.05 mbar to 5 mbar or about 0.1 mbar, respectively. In a second preferred variant however, the measurement position is located where the dispersion is inserted into the inside of the reduced pressure chamber by the flow restricting device. In this variant, the pressure is advantageously in the above indicated range from 0.01 mbar to 100 mbar, preferably from 0.1 mbar to 100 mbar or from 1 mbar to 100 mbar, particular advantageously in a range from 10 mbar to 100 mbar, particular preferably from 0.1 mbar to 50 mbar or from 1 mbar to 50 mbar, most preferably from 0.1 mbar to 40 mbar or from 1 mbar to 40 mbar. Thereby, the measurement position advantageously is distanced maximally 2 cm and thus 2 cm or less from the inlet. In a variant however, the measurement position is distanced by more than 2 cm from the inlet.

These two preferred variants can be excluding variants where only one of the variants applies. Thus, in case of the first above mentioned preferred variant, the pressure measured at the measurement position according to the second preferred variant may be higher or lower than indicated with respect to the range indicated in the second preferred variant. In case of the second above mentioned preferred variant however, the pressure measured at the measurement position according to the first preferred variant may be higher or lower than indicated with respect to the range indicated in the first preferred variant. Nonetheless, the two preferred variants can be considered as cumulative variants where both variants apply simultaneously.

In either variant, order to measure and thus to determine the pressure in the inside of the reduced pressure chamber, the ion source may comprise a pressure sensor. The ion source may however as well go without such a pressure sensor.

The solution of the invention has the advantage that due to the pressure in the range from 0.01 mbar to 100 mbar, from 0.1 mbar to 100 mbar, from 1 mbar to 100 mbar, from 0.1 mbar to 50 mbar, from 1 mbar to 50 mbar, from 0.1 mbar to 40 mbar or from 1 mbar to 40 mbar, respectively, in the reduced pressure chamber, the plasma in the dispersion is reproducible and can be held steady. This advantage particularly applies to the case where the pressure is determined at a measurement position in the inside of the reduced pressure chamber which is located where the dispersion is inserted into the inside of the reduced pressure chamber by the flow restricting device. Advantageously, this particular measurement position is distanced maximally 2 cm and thus 2 cm or less from the inlet. However, the measurement position can be distanced by more than 2 cm from the inlet, too. Independent of the precise distance of the measurement position from the inlet, a reproducible atomisation and ionisation of the aerosol particles can be obtained which enables a reliable and precise analysis of the elemental composition of the aerosol particles with a mass analyser. Additionally, the equipment of the ion source can be constructed simpler, less complex and smaller since no high vacuum or ultra-high vacuum is required. Furthermore, the solution of the invention has the advantage that no large amount of gas is required for running the analysis. In case the dispersion of aerosol particles dispersed in a gas is inserted into the inside of the reduced pressure chamber in its original composition, no separate gas supply is needed at all. This may for example be the case if ambient air with aerosol particles dispersed in the air is inserted into the inside of the reduced pressure chamber. In case the dispersion of aerosol particles dispersed in a gas is modified when being inserted into the inside of the reduced pressure chamber by exchanging the gas with a gas exchange device, however, a separate gas supply of clean gas is required. Nonetheless, the amount of clean gas required is limited because the pressure in the reduced pressure chamber is reduced as compared to atmospheric pressure. Thus, the equipment is less expensive and easier to maintain.

Advantageously, the laser is adapted for inducing in the plasma region in the inside of the reduced pressure chamber the plasma in the gas of the dispersion for atomising and ionising the aerosol particles to elemental ions. Thereby, the atomisation and ionisation of the aerosol particles to elemental ions or ionised metal oxides occurs to a large part indirectly via the plasma in the gas of the dispersion and only to a small part by a direct interaction between the laser beam and the aerosol particles. Thus, the laser beam is not required to be perfectly focused on individual aerosol particles for an optimal atomisation and ionisation. Rather, the laser can be optimised to ignite and hold the plasma steady in the gas which is much simpler. Thus, the plasma can easily be held steady in the dispersion which enables a more reliable and efficient atomisation and ionisation of the aerosol particles to elemental ions. Thus, the percentage of elemental ions and possible ionised metal oxides amongst the total amount of obtained ions is higher. Additionally, inducing the plasma in the gas of the dispersion has the advantage that the laser parameters can be optimized to ionise the gas of the dispersion. This enables to increase the reliability and efficiency of the atomisation and ionisation of the aerosol particles to elemental ions and possible ionised metal oxides even more. As consequence, a more reliable and precise analysis of the elemental composition of the aerosol particles is enabled when using the ion source in an apparatus or method for analysing the elemental composition of aerosol particles. An example of a laser which can be used to generate the plasma in the gas of in the dispersion in case the gas is Argon is an passive locking mode Nd:YAP laser with a wavelength of 1'078 nm. This laser can for example be a pulsed laser with laser pulses having a duration of 80 ns. Preferably a pulse frequency of this laser is 3 kHz or more. Other examples of such a laser are a tuneable diode laser having a wavelength close to 668.6 nm or an Nd:YAG laser with a wavelength of the second harmonic at 532 nm.

Preferably, the plasma region is located in a region where the dispersion is insertable into the inside of the reduced pressure chamber by the flow restricting device. This has the advantage that the plasma region is located in the region where the dispersion which is inserted into the inside of the reduced pressure chamber is expanding into the reduced pressure chamber. Thus, the plasma region is located inside of the reduced pressure chamber where the gas pressure is larger than in other parts of the inside of the reduced pressure chamber which are further distanced from where the dispersion is insertable into the inside of the reduced pressure chamber by the flow restricting device. Consequently, it is simpler to initiate the plasma and maintain the plasma steady which results in a more efficient and reliable atomisation and ionisation of the aerosol particles to elemental ions and possible ionised metal oxides. This advantage applies particularly when the plasma is induced in the gas of the dispersion. Advantageously, the plasma region is distanced maximally 2 cm and thus 2 cm or less from the inlet. In an alternative however, the plasma region can be distanced by more than 2 cm from the inlet.

Alternatively, the plasma region may be located in a different region in the inside of the reduced pressure chamber.

The ion source advantageously comprises a denuder for removing contaminations in the dispersion, the denuder fluidly coupling the inlet with the flow restricting device for inserting the dispersion through the denuder and subsequently through the flow restricting device into the inside of the reduced pressure chamber. Such contaminations are preferably gaseous contaminations. For example, such gaseous contaminations may be undesired trace gases, in particular volatile organic compounds (VOC) in the gas of the dispersion.

Advantageously, the ion source comprises a clean gas line for fluidly coupling a clean gas source via the denuder and the flow restricting device with the inside of the reduced pressure chamber. This clean gas is preferably a pure gas. The pure gas has preferably no hydrocarbon contamination. For example, the clean gas may be Argon or Nitrogen.

The clean gas line may comprise a switchable valve for separating the clean gas source from the denuder or fluidly coupling the clean gas source to the denuder. Independent on whether the clean gas line comprises such a switchable valve or not, the clean gas line has the advantage that clean gas can be passed through the denuder to the inside of the reduced pressure chamber and, in case the ion source is fluidly coupled to a mass analyser, ion mobility analyser or any other analyser, to the respective analyser, thus to serve as a zero gas for establishing the background of the measurement system.

In a variant however, the ion source may not comprise such a clean gas line.

Preferably, said ion source comprises a test gas line for fluidly coupling a test gas source via the denuder and the flow restricting device with the inside of the reduced pressure chamber. In a first preferred variant, the test gas contains known particles with known metal content. This has the advantage that the apparatus for analysing the elemental composition of aerosol particles which employs the ion source can be calibrated in a simple way by analysing the test gas. In a second preferred variant, the test gas is pure nitrogen with 10 ppm of benzene, toluene and xylene each, which is sometimes called BTX. In a variant, the test gas may however be a different gas.

The test gas line may comprise a switchable valve for separating the test gas source from the denuder or fluidly coupling the test gas source to the denuder. Independent on whether the test gas line comprises such a switchable valve or not, the test gas line has the advantage that test gas can be passed through the denuder to the inside of the reduced pressure chamber, thus allowing to test the performance of the denuder and if necessary regenerate the denuder before its performance deteriorates and the ion source provides elemental ions and possible ionised metal oxides with high background and therefore only enabling measurements with a low sensitivity if the ion source is coupled to a mass analyser, ion mobility analyser or any other analyser.

In a variant however, the ion source may not comprise such a test gas line.

Alternatively, the ion source may go without a denuder for removing contaminations in said dispersion. Such an alternative has the advantage that the ion source can be constructed simpler and thus cheaper.

Preferably, the ion source comprises a gas exchange device for exchanging the gas, in particular the air, in the dispersion by a clean plasma gas before inserting the dispersion comprising the aerosol particles into the inside of the reduced pressure chamber. This clean plasma gas is preferably an inert gas like Nitrogen or a noble gas like Helium, Neon, Argon, Krypton, Xenon or Radon. Nitrogen has the advantage that it is cheap and easy to obtain. It can even be gained on place from air without requiring complex equipment. In case Nitrogen is used, care should however be taken that the Nitrogen is not reacting with components of the aerosol particles. As compared to Nitrogen, noble gases have the advantage that they do not react with the aerosol particles. However, they are somewhat more expensive and difficult to obtain than Nitrogen, even though this difference is at least for Argon not severe. In any case, employing such a gas exchange device has the advantage that metal atoms comprised in the aerosol particles which are atomised are less likely to be oxidised to metal oxides. Thus, the efficiency of the ion source for generating elemental ions of metal atoms is increased, while less ionised metal oxides are generated.

In case the ion source comprises a gas exchange device, the gas exchange device preferably fluidly couples the inlet with the flow restricting device for inserting the dispersion through the gas exchange device and subsequently through the flow restricting device into the inside of the reduced pressure chamber. In case the ion source comprises a denuder, the gas exchange device advantageously fluidly couples the denuder with the flow restricting device. In a variant however, the gas exchange device may be arranged differently. For example, it may fluidly couple the inlet with the denuder, wherein the denuder is fluidly coupled with the flow restricting device.

Alternatively, the ion source may go without such a gas exchange device. Such an alternative has the advantage that the ion source can be constructed simpler and thus cheaper.

Independent on whether the ion source comprises a gas exchange device or not, some metal atoms possibly comprised in the aerosol particles may become ionised by the ion source to elemental ions, while some other of these metal atoms may become ionised and oxidised by the ion source to ionised metal oxides. In case the ion source is combined with an analyser like for example a mass analyser or an ion mobility analyser, the identity of the present metals can be identified from the elemental ions. However, even in case of ionised metal oxides, the identity of the present metals can be identified by identifying the specific ionised metal oxides.

Advantageously, the ion source comprises an aerodynamic lens or acoustic lens for focussing the aerosol particles to a focus region in the inside of the reduced pressure chamber. Such aerodynamic lenses which focus aerosol particles of a wide size range into a fine beam are known. One example of such an aerodynamic lens is described in U.S. Pat. No. 5,270,542 (Mc Murray et al.). Similarly, such acoustic lenses are known. They are based on one or more acoustic resonators. One example of such an acoustic lens is described in WO 2015/061546 A1 (Applied Research Associates Inc.) The use of any such aerodynamic lens for focussing the aerosol particles to a focus region in the inside of the reduced pressure chamber has the advantage that in the focus region, a higher number of aerosol particles per volume unit is obtained which enables a more efficient atomisation and ionisation of the aerosol particles to elemental ions and possible ionised metal oxides.

Preferably, the focus region is located within the plasma region. Advantageously, the laser is adapted for inducing the plasma inside the focusing region in the plasma region in the dispersion or in the gas of the dispersion for atomising and ionising the aerosol particles to elemental ions. This has the advantage that the aerosol particles are transferred more efficiently into the plasma. Consequently, the efficiency of atomising and ionising the aerosol particles is increased.

Alternatively, the ion source may go without such an aerodynamic lens or acoustic lens. Such an alternative has the advantage that the ion source can be constructed simpler and thus cheaper.

Preferably, the ion source comprises a fragmenting device, in particular a collision cell, for fragmenting ionised debris, in particular ionised molecules, originating from the aerosol particles, and possible ionised metal oxides, wherein the metal originates from the aerosol particles, into elemental ions, wherein the fragmenting device is fluidly coupled to the plasma region in the inside of the reduced pressure chamber for transferring ionised debris, in particular ionised molecules and possible ionised metal oxides, of the aerosol particles generated in the plasma through the fragmenting device for fragmenting the ionised debris, in particular ionised molecules, originating from the aerosol particles, and possible ionised metal oxides, wherein the metal originates from the aerosol particles, into elemental ions. Herein, ionised debris comprises anything ionised originating from the aerosol particles. Thus, ionised debris includes the elemental ions as well as other ionised debris like for example ionised molecules or ionised clusters of atoms which have not been atomised in the plasma and possible ionised metal oxides originating from the aerosol particles wherein the metals were oxidised by the gas of the dispersion. Thus, the fragmenting device has the advantage that a more efficient atomisation of the aerosol particles can be achieved which results in a higher gain of elemental ions.

In a preferred variant, the ion source comprises a reaction cell for reacting specific species of ionised debris, in particular ionised molecules, originating from said aerosol particles, and possible ionised metal oxides, wherein the metal originates from the aerosol particles, with a reaction gas inserted into the reaction cell. This has the advantage that ionised debris having very similar mass per charge ratios can be differentiated from each other in that the reaction gas is chosen such that only one species of the ionised debris reacts with the reaction gas and obtains thus a different mass per charge ratio.

In another preferred variant, the ion source comprises a separation gas chamber for passing at least some of the ionised debris originating from the aerosol particles through. This has the advantage that ionised debris having very similar mass per charge ratios can be differentiated from each other in that depending on the cross section of the debris, debris having a larger cross section are passed through the separation gas chamber while debris having a smaller cross section are stopped within the separation gas chamber.

Alternatively, the ion source may go without such a fragmenting device, reaction cell or separation gas chamber. Such an alternative has the advantage that the ion source can be constructed simpler and thus cheaper.

In a preferred embodiment, an apparatus for analysing an elemental composition of aerosol particles preferably comprises an ion source according to the invention and a first mass analyser for analysing said elemental ions and possible ionised metal oxides, wherein the inside of the reduced pressure chamber is fluidly coupled with the first mass analyser. This first mass analyser preferably provides spectra of values of mass per charge ratios of the analysed ions, the spectra being so-called mass spectra. In case the ion source comprises a fragmenting device, the plasma region in the inside of the reduced pressure chamber is advantageously coupled with the first mass analyser via the fragmenting device. Furthermore, in the preferred embodiment, a method for analysing an elemental composition of aerosol particles preferably comprises the steps of generating elemental ions from aerosol particles with the method according to the invention, transferring the elemental ions and possible ionised metal oxides to a first mass analyser and analysing the elemental ions and possible ionised metal oxides with the first mass analyser. In case the ion source comprises a fragmenting device, the elemental ions and possible ionised metal oxides are preferably transferred from the plasma region in the inside of the reduced pressure chamber via the fragmenting device to the first mass analyser. Particular preferably, ionised debris, in particular ionised molecules, of the aerosol particles, and possible ionised metal oxides, wherein the metal originates from the aerosol particles, generated in the plasma are transferred from the plasma region in the inside of the reduced pressure chamber through the fragmenting device for fragmenting the ionised debris, in particular ionised molecules, originating from the aerosol particles, and possible ionised metal oxides, wherein the metal originates from the aerosol particles, into elemental ions, wherein the elemental ions and possible remaining ionised metal oxides leaving the fragmenting device are subsequently transferred to the first mass analyser. Herein, ionised debris comprises anything ionised originating from the aerosol particles. Thus, ionised debris includes the elemental ions as well as other ionised debris like for example ionised molecules or ionised clusters of atoms which have not been atomised in the plasma.

The embodiment of the apparatus and method for analysing an elemental composition of aerosol particles has the advantage that a reliable and precise analysis of the elemental composition of the aerosol particles is enabled. However, the ion source according to the invention may be constructed, produced and sold as a separate unit. Furthermore, the ion source according to the invention and the method according to the invention may be employed independent of the above preferred embodiment with the first mass analyser.

In a variant, the apparatus may comprise an ion mobility analyser comprising the first mass analyser as detector. In this case, the ion mobility analyser may comprise a drifting region for the elemental ions and possible ionised metal oxides to pass and the first mass analyser as detector in order to determine the mobility of the ions based on the time the elemental ions and possible ionised metal oxides require to pass the drifting region.

As an alternative to such an apparatus and method for analysing an elemental composition of aerosol particles, the ion source according to the invention may for example be employed in a different apparatus like an ion mobility spectrometer. In this example, the apparatus may be constructed essentially with the same features as described above but comprising an ion mobility analyser with a detector which is not the first mass analyser.

In the before mentioned preferred embodiment of the apparatus and method for analysing the elemental composition of aerosol particles, the first mass analyser is preferably a time-of-flight mass analyser. This has the advantage that a precise and reliable analysis of the elemental composition of the aerosol particles is enabled.

Alternatively, the first mass analyser may however be a different type of mass analyser like for example a quadrupole mass analyser or a rotating field mass analyser.

The apparatus for analysing an elemental composition of aerosol particles preferably comprises a differentially pumped interface comprising at least one differentially pumped stage, preferably at least two differentially pumped stages, particular preferably at least three differentially pumped stages, the differentially pumped interface fluidly coupling the inside of the reduced pressure chamber with the first mass analyser for transferring the elemental ions and possible ionised metal oxides from the reduced pressure chamber to the first mass analyser. In case the ion source comprises a fragmenting device, the differentially pumped interface preferably fluidly couples the fragmenting device with the first mass analyser for transferring the elemental ions, possible ionised metal oxides and ionised debris of the aerosol particles via fragmenting device to the first mass analyser. In any case, the differentially pumped interface has the advantage that the elemental ions and possible ionised metal oxides can be transferred into the first mass analyser, wherein a pressure in the first mass analyser is preferably lower than the pressure in the inside of the reduced pressure chamber, wherein the pressure in the first mass analyser is particularly preferably less than 0.0001 mbar, most preferably less than 0.00001 mbar. Thus, a more precise and reliable analysis of the elemental composition of the aerosol particles is enabled.

Alternatively, the apparatus for analysing an elemental composition of aerosol particles may go without such a differentially pumped interface. Such an alternative has the advantage that the apparatus is constructed simpler.

Advantageously, the apparatus for analysing an elemental composition of aerosol particles comprises a multipole ion guide, in particular a quadrupole ion guide, for resonant excitation of the elemental ions and possible ionised metal oxides, the multipole ion guide fluidly coupling the inside of the reduced pressure chamber with the first mass analyser for transferring the elemental ions and possible ionised metal oxides from the reduced pressure chamber to the first mass analyser. Such multipole ion guides for resonant excitation of elemental ions are generally known. They are also referred to as radio frequency (RF) multipole ion guides or as quadrupole filters. They often provide an ion guide chamber that holds two superimposed fields. A first field is used for transport of ions through the residual gas from the entrance to the exit of the respective multipole ion guide. For this, the field direction is essentially parallel to the chamber main axis, and the field can be static. A second electric field is applied for confining the ions close to the axis. This is often done with a RF multipole field with low amplitudes on the chamber axis and larger amplitudes away from the axis. Such RF fields create an effective potential confining the ions to the axis. The transport field controls the axial ion movement and directs the ions towards the exit orifice into the (next) higher vacuum, whereas the RF field confines the ions to the center axis within the chamber. An example of such a device is described in U.S. Pat. No. 4,963,736 (MDS Inc.) as well as in Douglas J. D. and French J. B., Collisional Cooling effects in radio frequency quadrupoles, J. Am. Soc. Mass Spectrom. 3, 398, 1992. It uses radio frequency (RF) fields, which can focus the ions along an axis and additionally can cool the ions through collisions to further increase transmission efficiencies into the mass analyser. The fields are generated by elongated rods that are arranged within the vacuum chambers. Thus, in case the apparatus for analysing an elemental composition of aerosol particles comprises a multipole ion guide, in particular a quadrupole ion guide, for resonant excitation of the elemental ions and possible ionised metal oxides, the multipole ion guide fluidly coupling the inside of the reduced pressure chamber with the first mass analyser for transferring the elemental ions and possible ionised metal oxides from the reduced pressure chamber to the first mass analyser, the multipole ion guide is preferably adapted for holding two superimposed electric fields, wherein a first electric field of the two superimposed electric fields is a static electric field and wherein a second field of the two superimposed electric fields is a RF multipole field with low amplitudes on an axis of the multipole ion guide and larger amplitudes away from the axis. In an advantageous variant, a strength of the first electric field is tuneable.

Such multipole ion guides allow transferring ions of a certain bandwidth of mass to charge ratios from the entrance to the exit of the multipole ion guide, while not transferring ions having other mass to charge ratios. By tuning the strength of the first electric field, the ions can be accelerated or deaccelerated when being transferred from entrance to the exit of the multipole ion guide. Additionally, by choosing the frequency of the second electric field, ions of a certain mass to charge ratio within the bandwidth of mass to charge ratios can be excited by resonant excitation and thus rejected without being transferred to the exit of the mulitpole ion guide. Thus, employing such a multipole ion guide has the advantage that ions of a bandwidth of mass to charge ratios of interest can be transferred to the first mass analyser, while specific ions within this bandwith originating from the gas of the dispersion can be thrown out of the multipole ion guide without being transferred to the first mass analyser. Consequently, a more reliable and more precise analysis of the elemental composition of the aerosol particles is enabled.

In case the ion source comprises a fragmenting device, the multipole ion guide preferably fluidly couples the fragmenting device with the first mass analyser for transferring the elemental ions and possible ionised metal oxides from the fragmenting device to the first mass analyser. In case the ion source comprises a differentially pumped interface, the multipole guide preferably fluidly couples the differentially pumped interface with the first mass analyser for transferring the elemental ions and possible ionised metal oxides from the differentially pumped interface to the first mass analyser.

Advantageously, the multipole ion guide is bent. This has the advantage that the apparatus can be constructed more compact and thus easier to transport. Alternatively however, the multipole ion guide may be straight instead of being bent. Such a straight multipole ion guide has the advantage that it is easier and cheaper constructed which results in lower construction costs for the apparatus.

Alternatively, the apparatus for analysing an elemental composition of aerosol particles may go without such a multipole ion guide. Such an alternative has the advantage that the apparatus is simpler constructed.

Advantageously, the apparatus for analysing an elemental composition of aerosol particles comprises a second mass analyser for analysing the elemental ions and possible ionised metal oxides, wherein the inside of the reduced pressure chamber is fluidly coupled with the second mass analyser for transferring the elemental ions and possible metal oxides from the reduced pressure chamber to the second mass analyser. This second mass analyser preferably provides spectra of values of mass per charge ratios of the analysed ions, the spectra being so-called mass spectra. In case the ion source comprises a fragmenting device, the plasma region in the inside of the reduced pressure chamber is advantageously fluidly coupled with the second mass analyser via the fragmenting device. In case the apparatus comprises a differentially pumped interface, the differentially pumped interface preferably fluidly couples the inside of the reduced pressure chamber or fragmenting device, respectively, with the second mass analyser for transferring the elemental ions and possible ionised metal oxides from the reduced pressure chamber to the second mass analyser.

The second mass analyser has the advantage that it can be optimised for a different purpose than the first mass analyser is optimised for. Thus, a more detailed analysis of the elemental composition of the aerosol particles is enabled. In order to achieve this advantage, the first mass analyser and the second mass analyser may be constructed as separate units, each being fluidly coupled to the ion source, or they may be constructed together as one mass analysing unit which is fluidly coupled to the ion source. In the latter case, the one mass analysing unit is a dual polarity mass analyser capable of simultaneously analysing positive and negative ions.

Advantageously, the second mass analyser is a time-of-flight mass analyser. This has the advantage that a precise and reliable analysis of the elemental composition of the aerosol particles is enabled.

Alternatively, the second mass analyser may be a different type of mass analyser like for example a quadrupole mass analyser or a rotating field mass analyser.

Preferably, the first mass analyser is adapted for analysing positive ions and the second mass analyser is adapted for analysing negative ions. Advantageously, positive ions of the elemental ions are transferable from the inside of the reduced pressure chamber to the first mass analyser and negative ions of the elemental ions are transferable from the inside of the reduced pressure chamber to the second mass analyser. This has the advantage that a more complete analysis of the elemental composition of the aerosol particles is enabled.

In an advantageous variant, the positive ions of the elemental ions are transferable from the plasma region away in a first direction in order to transfer them from the inside of the reduced pressure chamber to the first mass analyser and the negative ions are transferable from the plasma region away in a second direction which is different from the first direction in order to transfer them from the inside of the reduced pressure chamber to the second mass analyser, wherein the first direction and the second direction are different from a direction in which the aerosol particles enter the plasma region before being atomised and ionised. This has the advantage that less uncharged items like atoms, molecules or particles enter the first mass analyser and second mass analyser such that undesired background signal in the obtained mass spectra is reduced. Advantageously, the apparatus comprises a first ion guide for transferring the positive ions of the elemental ions from the plasma region away in the first direction in order to transfer the positive ions of the elemental ions from the inside of the reduced pressure chamber to the first mass analyser and a second ion guide for transferring the negative ions of the elemental ions from the plasma region away in the second direction in order to transfer the negative ions of the elemental ions from the inside of the reduced pressure chamber to the second mass analyser. Thereby, the first ion guide and the second ion guide may for example each be an electrostatic analyser, a multipole ion guide, a stack of Einzel lenses or any other type of ion guide.

In a variant, the first mass analyser may however both be adapted for analysing positive ions or for analysing negative ions. In this case, one of the two mass analysers may for example be optimised for analysing a large bandwidth of mass to charge ratios, while the other of the two mass analysers may for example be optimised for analysing a smaller bandwidth of mass to charge ratios of interest in more detail.

Alternatively, the apparatus may go without a second mass analyser.

Preferably, the apparatus comprises an ionised aerosol particle mobility analyser for separating ionised aerosol particles according to their mobility, wherein the ionised aerosol particle mobility analyser is fluidly coupled with the inlet of the ion source for inserting the dispersion comprising the aerosol particles via the aerosol particle mobility analyser to said ion source. In this case, the aerosol particles or at least some of the aerosol particles in the dispersion are ionised aerosol particles. Since many aerosol particles are charged and thus ionised anyway by nature, the apparatus can be constructed simpler than if it would comprise additionally an aerosol particle ionisation source. In a preferred variant however, the apparatus comprises such an aerosol particle ionisation source. In this case, the apparatus for analysing an elemental composition of aerosol particles preferably comprises an aerosol particle ionisation source for ionising the aerosol particles and the ionised aerosol particle mobility analyser for separating ionised aerosol particles according to their mobility, wherein the aerosol particle ionisation source is fluidly coupled with the ionised aerosol particle mobility analyser and the ionised aerosol particle mobility analyser is fluidly coupled with the inlet of the ion source for inserting the dispersion comprising the ionised aerosol particles from the aerosol particle ionisation source via the aerosol particle mobility analyser to the ion source. In this advantageous embodiment, the aerosol particle ionisation source may be any ionisation source which is suitable for ionising aerosol particles without atomising the aerosol particles. Preferably, the aerosol particle ionisation source is adapted to ionise aerosol particles without even fragmenting the aerosol particles. For example, the aerosol particle ionisation source may work on the basis of collisions of gaseous ions, generated by unipolar or bipolar chargers, with aerosol particles. Thus, the aerosol particle ionisation source may be based on a diffusion charging principle or on a field charging principle. In the diffusion charging principle, the ionisation is caused by collisions driven by random ion motion. In the field charging principle however, particle-ion collisions are influenced by an applied external field.

Independent on whether the apparatus comprises such an aerosol particle ionisation source, the ionised aerosol particle mobility analyser is any ion mobility analyser suitable for analysing the mobility of ionised aerosol particles. Thus, the ionised aerosol particle mobility analyser preferably comprises a drifting region for passing the ionised aerosol particles and a first detection unit for detecting when an ionised aerosol particle enters the drifting region and a second detection unit for detecting when an ionised aerosol particle has passed the drifting region. This first detection unit and second detection unit may for example both be optical units. The first detection unit for example may be instead of an optical unit an ion gate which is controllable by a control unit for introducing at known times bunches of ionised aerosol particles into the ionised aerosol particle mobility analyser.

How the dispersion comprising the aerosol particles is inserted into the aerosol particle ionisation source or into the ionised aerosol particle mobility analyser, respectively, is not of further relevance. For example, the aerosol particle ionisation source or the ionised aerosol particle mobility analyser, respectively, may comprise an inlet for inserting the dispersion comprising the aerosol particles dispersed in a gas into the aerosol particle ionisation source or the ionised aerosol particle mobility analyser, respectively.

As an alternative, the apparatus for analysing an elemental composition of aerosol particles may go without such an aerosol particle ionisation source and ionised aerosol particle mobility analyser.

Advantageously, the apparatus for analysing an elemental composition of aerosol particles comprises further comprises an electronic data acquisition system for processing signals provided by the first mass analyser or possible second mass analyser, whereas the electronic data acquisition system comprises at least one analogue-to-digital converter producing digitised data from signals obtained from the first mass analyser or possible second mass analyser, respectively, and a fast processing unit receiving the digitized data from the analogue-to-digital converter, wherein the fast processing unit is programmed to continuously, in real time inspect the digitized data for events of interest measured by the first mass analyser or possible second mass analyser, respectively, and the electronic data acquisition system is programmed to forward the digitised data representing mass spectra relating to events of interest for further analysis and to reject the digitised data representing mass spectra not relating to events of interest. This has the advantage that a high data acquisition speed can be achieved.

In particular, the digitized data is constituted by (or comprises) mass spectra, for simplicity, in the following this term is used for spectra of values of m/Q (mass/charge; mass per charge ratio). The fast processing unit may comprise in particular a digital signal processor (DSP), most preferably a Field Programmable Gate Array (FPGA).

Continuous, real-time processing means that essentially all incoming data obtained from the ADC may be readily inspected for events of interest prior to deciding about forwarding or rejecting the data, the time used for inspection of a certain portion of data being equal or less than the time used for obtaining the signals represented by the data portion by the first mass analyser or second mass analyser, respectively. In case the first mass analyser or second mass analyser, respectively, is a time-of-flight mass analyser, the first mass analyser or second mass analyser, respectively, may be configured to continuously acquire time-of-flight (TOF) extractions. In this case, simultaneous to the continuous acquisition of TOF extractions, the fast processing unit is preferably used for real-time analysis of the data to identify regions within the continuous stream of TOF extractions that contain events of interest. This is of particular interest for a single particle aerosol mass spectrometer where each time when an aerosol particle is ionised by ion source can be detected by the fast processing unit by identifying regions within the continuous stream of TOF extractions that contain events of interest in the form of a signature of elemental ions originating from an atomised aerosol particle.

We refer to those instances when a sample of interest is present as events or events of interest. We refer to the method as "event triggering".

Rejection of digitized data not relating to events of interest means that this data is not forwarded to the usual further analysis. It may be completely discarded, or processed in a way that does not use a substantial capacity of the communication channel linking the electronic data acquisition system to the hardware performing the further analysis. A corresponding processing may include heavy data compression, in particular lossy compression as achieved by further processing, especially on-board at the fast processing unit.

Since the maximum continuous save rate (MCSR) of existing technologies is limited by overhead processes, the data rate for rapidly occurring events increase to a level that is too large to handle for today's data systems, whose bottle necks are given in particular by the download speed from the DAQ to the PC, the processing of the data in the PC, or the writing of the data to the mass storage device. The MCSR, in turn, limits the maximum rate at which events can occur and still be individually saved with high efficiency.

Event triggering circumvents these overhead bottlenecks by transferring and saving only select TOF extractions that correspond to events of interest (EOIs). That is, TOF data are continuously acquired but not all data are transferred and saved.

Event triggering allows for maintaining efficiency at high speed by eliminating all processing times (idle time in acquisition) for data segments that do not contain information about events. By reducing dead times, reducing PC data load, and increasing the fraction of events that may be recorded at high rates, the device allows for improving TOF performance for experiments targeting both steady-state and time-varying characterization of samples.

In particular, the data acquisition with event triggering enables highly efficient data acquisition at rates faster than the MCSR for experiments measuring multiple successive samples (discontinuous), i. e. cases where the signal of interest is oscillating between ON states (sample present) and OFF states (time between sample). It basically allows for measuring the complete chemical composition of many events in rapid succession with a TOFMS. Thus it is particularly advantageous in case the apparatus is single particle aerosol mass spectrometer.

Furthermore, event triggering is particularly preferable in systems for measuring successive samples that are introduced to the mass spectrometer in a rapid and non-periodic or non-predictable manner, i. e. occurrences of successive events are not strictly periodic in time and external triggering of the TOF is not possible and/or practical. In these and other cases, averaging of data may be difficult and/or lack meaning. A highly relevant example of non-periodical, inhomogeneous events is the measurement of the elemental composition of individual small particles, for example nano particles, aerosol particles, cells or other biological entities, clusters and other entities with a dimension falling in the range of 1 nm or larger. In such cases, particles are rapidly sampled into the mass spectrometer in a sporadic succession.

Further details on the event triggering are described in WO 2016/004542 A1 of Tofwerk AG.

Alternatively, the apparatus for analysing an elemental composition of aerosol particles may not be a single particle aerosol mass spectrometer.

Preferably, the apparatus for analysing an elemental composition of aerosol particles further comprises an aerosol particle detection unit for detecting aerosol particles when they enter said plasma region, and a control unit for synchronising said laser and said first mass analyser with said aerosol particle detection unit in order to enable single aerosol particle analysis. This has the advantage that the efficiency of atomising and ionising the aerosol particles to elemental ions and possible ionised metal oxides is increased. Furthermore, this has the advantage that single particle aerosol analysis is enabled.

In case said apparatus comprises an aerodynamic lens or acoustic lens for focussing said aerosol particles to a focus region inside said reduced pressure chamber, wherein said focus region is located within said plasma region, the aerosol particle detection unit is preferably adapted for detecting aerosol particles when entering said focus region. This has the advantage that the efficiency of atomising and ionising the aerosol particles to elemental ions and possible ionised metal oxides is increased even further.

Alternatively, the apparatus may go without such an aerosol particle detection unit and without such a control unit.

Preferably, the apparatus for analysing an elemental composition of aerosol particles is a single particle aerosol mass spectrometer. In this case, in the method according to the invention, the aerosol particles are preferably each analysed individually by atomising and ionising each of the aerosol particles individually to elemental ions and possible ionised metal oxides and subsequently transferring for each aerosol particle the obtained elemental ions to the first mass analyser or possible second mass analyser, respectively, and analysing the obtained elemental ions and possible ionised metal oxides with the first mass analyser or possible second mass analyser, respectively. Thus, the apparatus advantageously comprises a control unit for triggering the mass analyser whenever an individual aerosol particle reaches the plasma region in the ion source, triggering the mass analyser for analysing the elemental ions and possible ionised metal oxides originating from the individual aerosol particle. For this analysis of the elemental ions and possible ionised metal oxides originating from one individual aerosol particle, the elemental ions and possible ionised metal oxides produced by the ion source are preferable extracted into the mass analyser in a burst of ion extractions for the analysis.

Other advantageous embodiments and combinations of features come out from the detailed description below and the totality of the claims.

BRIEF DESCRIPTION OF THE DRAWINGS

The drawings used to explain the embodiments show.

In the figures, the same components are given the same reference symbols.

PREFERRED EMBODIMENTS

Figure 1:
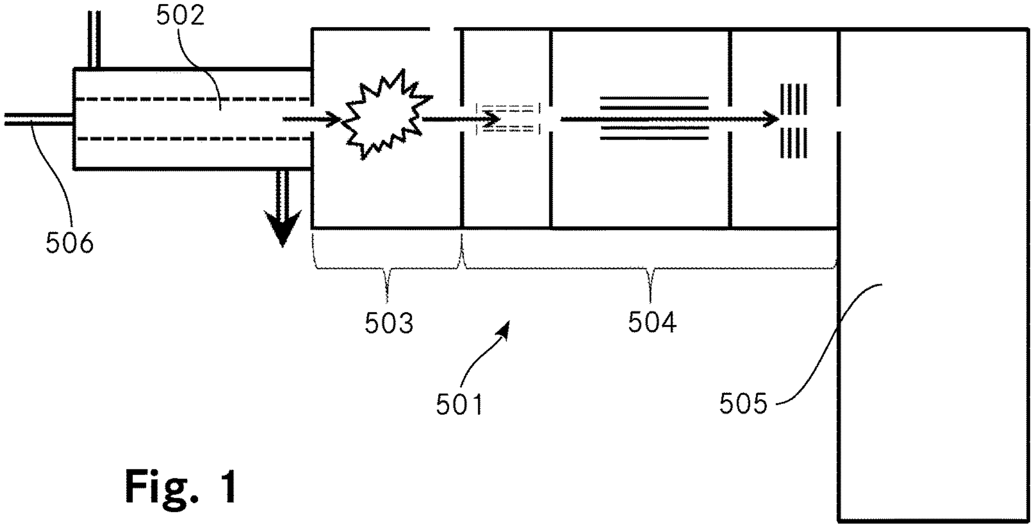
FIG. 1 a schematic view of a known, prior art apparatus for analysing the elemental composition of aerosol particles based on an inductively coupled plasma ion source, FIG. 2 a schematic view of a known, prior art ATOFMS type instrument for analysing the elemental composition of aerosol particles, FIG. 3 a schematic view of an apparatus for analysing an elemental composition of aerosol particles using an ion source according to the invention for generating elemental ions and possible ionised metal oxides from aerosol particles, FIG. 4 a schematic view of another apparatus for analysing an elemental composition of aerosol particles, the apparatus comprising another ion source according to the invention for generating elemental ions and possible ionised metal oxides from aerosol particles, FIG. 5 a schematic view of a more space saving configuration of the apparatus shown in FIG. 4, and FIG. 6 a schematic view with reduced details of a modified apparatus for analysing the elemental composition of aerosol particles.

FIG. 1 shows a schematic view of a known, prior art apparatus 501 for analysing the elemental composition of aerosol particles, the apparatus being based on an inductively coupled plasma ion source. The apparatus 501 comprises a gas exchange device 502, a plasma ion source 503, an atmospheric pressure interface 504 and a mass analyser 505. Aerosol particles dispersed in a dispersion comprising the aerosol particles dispersed in air are inserted through an inlet 506 into the gas exchange device 502. In the gas exchange device 502, the air in the dispersion is exchanged by a clean plasma gas which is in the present case argon. Thus, after having passed the gas exchange device 502, the dispersion comprises the aerosol particles dispersed in argon instead of air. This dispersion is then transferred into the plasma ion source 503 where the aerosol particles are atomised and ionised by an inductively coupled plasma as described for example in US 2015/0235833 A1 of Bazargan et al. The resulting elemental ions are then transferred through the atmospheric pressure interface 504, where the gas pressure is reduced, to the mass analyser 505 where they are analysed. The mass analyser 505 is a known time-of-flight mass analyser and provides mass spectra which are spectra of values of mass per charge of the elemental ions.

Figure 2:
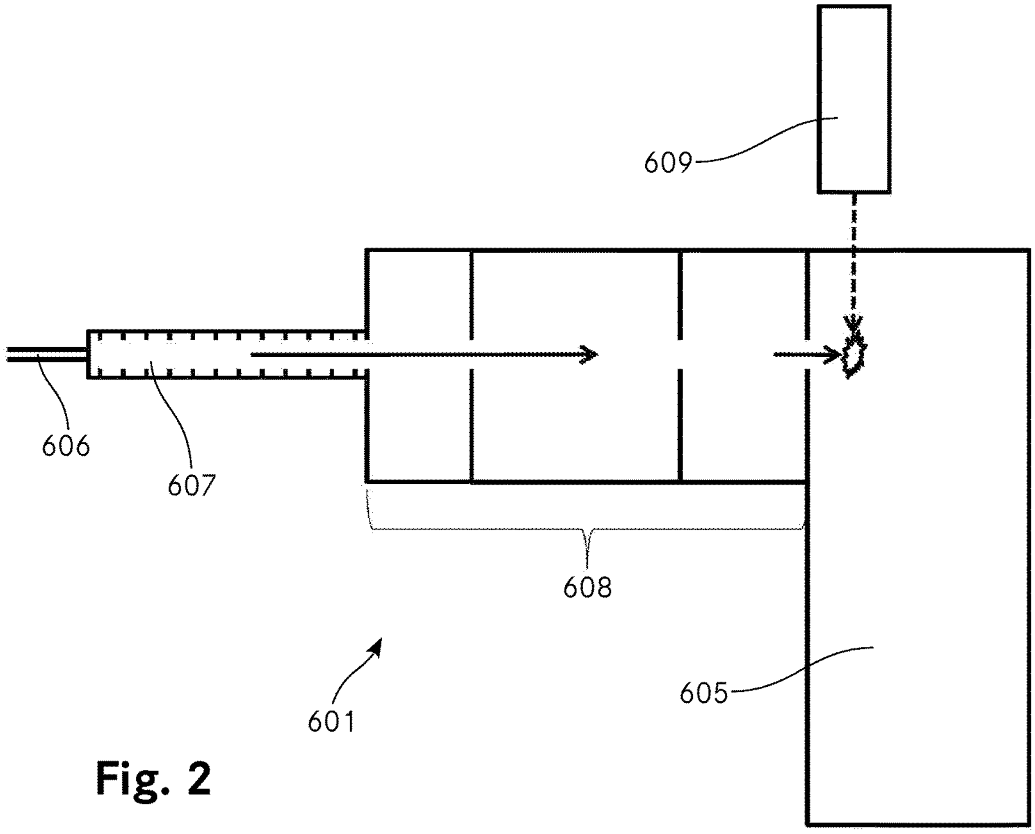

FIG. 2 shows a schematic view of a known, prior art ATOFMS type instrument for analysing the elemental composition of aerosol particles. In this apparatus 601, a laser 609 is used for vaporising the aerosol particles and ionising the vaporised substances under high vacuum. This apparatus 601 comprises an aerodynamic lens 607 which focuses the aerosol particles to the centre of the airstream inserted through the inlet 606 of the apparatus 601. From the aerodynamic lens 607, the aerosol particles are transferred through a differentially pumped interface 608 into a high vacuum or ultra-high vacuum with a pressure of approximately $10^{-7}$ mbar in mass analyser 605. There, the aerosol particles are hit by a laser beam generated by laser 609 such that the aerosol particles are atomised and ionised. Subsequently, the resulting elemental ions are analysed by the mass analyser 605. Instead of the aerodynamic lens 607, the apparatus 601 may for example comprise an acoustic lens.

Figure 3:
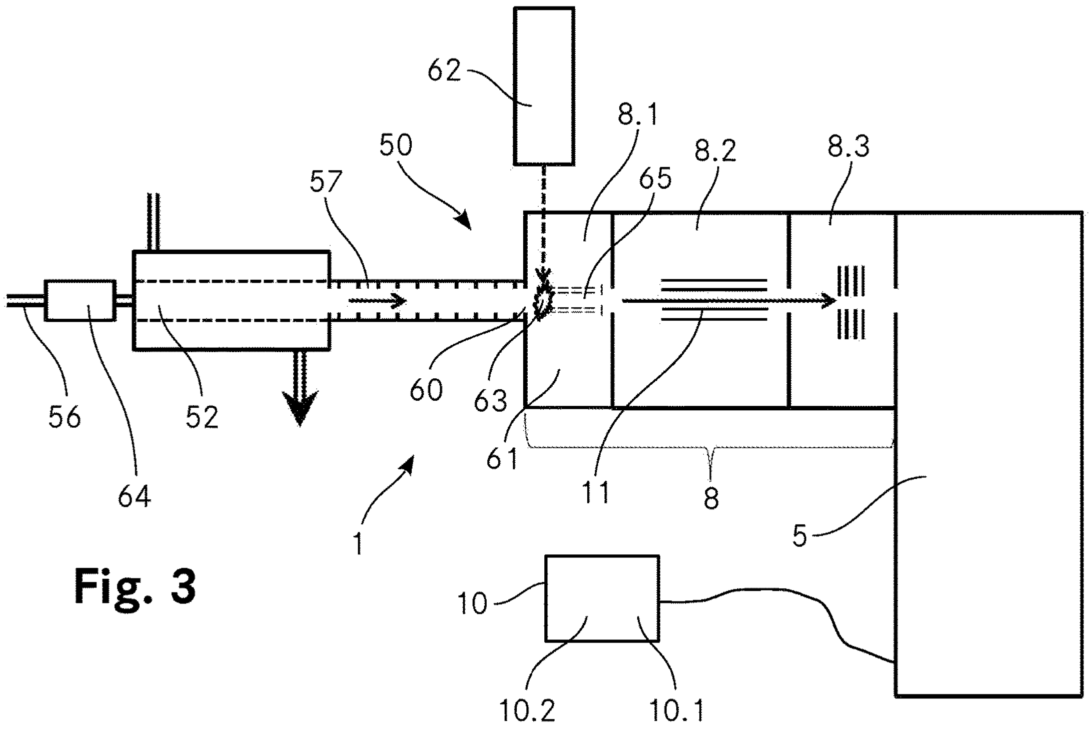

FIG. 3 shows a schematic view of an apparatus 1 for analysing an elemental composition of aerosol particles, the apparatus 1 comprising an ion source 50 according to the invention for generating elemental ions and possible ionised metal oxides from aerosol particles. The apparatus 1 further comprises a differentially pumped interface 8, a mass analyser 5 and a data acquisition system 10. The ion source 50 comprises an inlet 56, a denuder 64, a gas exchange device 52, an aerodynamic lens 57, a flow restricting device 60 which is formed in the present example by an orifice, a reduced pressure chamber 61 and a laser 62.

A dispersion comprising the aerosol particles dispersed in air is inserted through inlet 56 into the denuder 64, where the air is scrubbed from gaseous trace gases by passing the denuder 64. Thus, gaseous contaminants in the air like for example trace gases, in particular VOC are greatly reduced which reduces the background in the elemental analysis of the aerosol particles otherwise caused by such gaseous contaminants. From the denuder 64, the dispersion is transferred through the gas exchange device 52, where a clean plasma gas is substituted for the air in the dispersion. The clean plasma gas is in the present example argon. It could however be any other noble gas or even any inert gas like for example nitrogen. From the gas exchange device 52, the dispersion comprising the aerosol particles now dispersed in argon instead of air is transferred through the aerodynamic lens 57 and inserted through the flow restricting device 60 into the reduced pressure chamber 61.

In a variant to the embodiment shown in FIG. 3, the apparatus 1 may go without denuder, without gas exchange device or the succession of the denuder 64 and the gas exchange device 52 may be swapped such that the denuder 64 is located downstream of the gas exchange device 52.

In the embodiment shown in FIG. 3, the pressure in the reduced pressure chamber 61 is reduced as compared to atmospheric pressure. More precisely, the pressure in the reduced pressure chamber 61 is in the range from 0.01 mbar to 100 mbar. In a variant, the pressure in the reduced pressure chamber 61 however is in the range from 0.1 mbar to 100 mbar. In another variant, the pressure in the reduced pressure chamber 61 is in the range from 1 mbar to 100 mbar. In another variant, the pressure in the reduced pressure chamber 61 is in the range from 0.1 mbar to 50 mbar. In another variant, the pressure in the reduced pressure chamber 61 is in the range from 1 mbar to 50 mbar. In another variant, the pressure in the reduced pressure chamber 61 is in the range from 0.1 mbar to 40 mbar. In yet another variant, the pressure in the reduced pressure chamber 61 is in the range from 1 mbar to 40 mbar. In order to achieve and maintain the indicated pressure in the reduced pressure chamber 61, the reduced pressure chamber 61 may comprise some means for achieving and maintaining the pressure in a range from 0.01 mbar to 100 mbar, from 0.1 mbar to 100 mbar, from 1 mbar to 100 mbar, from 0.1 mbar to 50 mbar, from 1 mbar to 50 mbar, from 0.1 mbar to 40 mbar or from 1 mbar to 40 mbar, respectively, in the inside of the reduced pressure chamber 61. Such a means may for example be a vacuum pump. In the present example however, the reduced pressure chamber 61 is the first chamber of a differentially pumped interface 8 which comprises three differentially pumped chambers 8.1, 8.2, 8.3. Thus, the means for achieving and maintaining this pressure in the reduced pressure chamber 61 is a vacuum pump (not shown here) of the differentially pumped interface 8.

As the dispersion is inserted into the inside of the reduced pressure chamber 61, the aerosol particles are focused by the aerodynamic lens 57 to a focus region which is located in the inside of the reduced pressure chamber 61 in a region where the dispersion is inserted into the inside of the reduced pressure chamber 61 by the flow restricting device 60. Thus, the focus region is located in a region where the dispersion which is inserted into the inside of the reduced pressure chamber 61 is expanding into the reduced pressure chamber 61. Consequently, the focus region is located inside of the reduced pressure chamber 61 where the gas pressure is larger than in other parts of the inside of the reduced pressure chamber 61 which are further distanced from where the dispersion is inserted into the inside of the reduced pressure chamber 61 by the flow restricting device 60.

Since the pressure in the inside of the reduced pressure chamber 61 is inhomogeneous, the above indicated value of the pressure in the above indicated range from 0.01 mbar to 100 mbar, from 0.1 mbar to 100 mbar, from 1 mbar to 100 mbar, from 10 mbar to 100 mbar, from 0.1 mbar to 50 mbar, from 1 mbar to 50 mbar, from 0.1 mbar to 40 mbar or from 1 mbar to 40 mbar, respectively, refers to the pressure measured in the inside of the reduced pressure chamber 61 at a first measurement position located where the dispersion is inserted into the inside of the reduced pressure chamber 61 by the flow restricting device 60. Thus, the first measurement position is distanced by maximally 2 cm and thus 2 cm or less from the inlet 56. Thereby, the apparatus 1 may go with or without a first pressure sensor located at the first measurement position for determining the pressure. In a variant however, the above indicated value of the pressure in the above indicated range from 0.01 mbar to 100 mbar, from 0.1 mbar to 100 mbar, from 1 mbar to 100 mbar, from 0.1 mbar to 50 mbar, from 1 mbar to 50 mbar, from 0.1 mbar to 40 mbar or from 1 mbar to 40 mbar, respectively, in the inside of the reduced pressure chamber 61 is the pressure measured by a second pressure sensor in the inside of the reduced pressure chamber 61 at a second measurement position where a gradient of the pressure is less than 10%, preferably less than 5%, particular preferably less than 2% of the maximum gradient of the pressure in the focus region. As a consequence, the second measurement position is distanced from the region where the dispersion is inserted into the reduced pressure chamber 61 and distanced from a position where the means for achieving and maintaining the indicated pressure in the reduced pressure chamber 61 is connected to the reduced pressure chamber 61. Thereby, the second measurement position is distanced by more than 2 cm from the insert 56.

In another variant, the pressure in the above indicated range refers to the pressure measured at the first measurement position and at the second measurement position, wherein the pressure measured at the respective position is within the indicated range. Thus, in a first variant, the pressure measured at the first measurement position is in the range from 0.01 mbar to 100 mbar, while the pressure at the second measurement position is in the range from 0.1 mbar to 100 mbar, from 1 mbar to 100 mbar, from 0.1 mbar to 50 mbar, from 1 mbar to 50 mbar, from 0.1 mbar to 40 mbar or from 1 mbar to 40 mbar, respectively. In a second variant, the pressure measured at the first measurement position is in the range from 0.1 mbar to 100 mbar, while the pressure at the second measurement position is in the range from 0.1 mbar to 100 mbar, from 1 mbar to 100 mbar, from 0.1 mbar to 50 mbar, from 1 mbar to 50 mbar, from 0.1 mbar to 40 mbar or from 1 mbar to 40 mbar, respectively. In a third variant, the pressure measured at the first measurement position is in the range from 1 mbar to 100 mbar, while the pressure at the second measurement position is in the range from 0.1 mbar to 100 mbar, from 1 mbar to 100 mbar, from 0.1 mbar to 50 mbar, from 1 mbar to 50 mbar, from 0.1 mbar to 40 mbar or from 1 mbar to 40 mbar, respectively. In a fourth variant, the pressure measured at the first measurement position is in the range from 10 mbar to 100 mbar, while the pressure at the second measurement position is in the range from 0.1 mbar to 100 mbar, from 1 mbar to 100 mbar, from 0.1 mbar to 50 mbar, from 1 mbar to 50 mbar, from 0.1 mbar to 40 mbar or from 1 mbar to 40 mbar, respectively. In a fifth variant, the pressure measured at the first measurement position is in the range from 0.1 mbar to 50 mbar, while the pressure at the second measurement position is in the range from 0.1 mbar to 100 mbar, from 1 mbar to 100 mbar, from 0.1 mbar to 50 mbar, from 1 mbar to 50 mbar, from 0.1 mbar to 40 mbar or from 1 mbar to 40 mbar, respectively. In a sixth variant, the pressure measured at the first measurement position is in the range from 1 mbar to 50 mbar, while the pressure at the second measurement position is in the range from 0.1 mbar to 100 mbar, from 1 mbar to 100 mbar, from 0.1 mbar to 50 mbar, from 1 mbar to 50 mbar, from 0.1 mbar to 40 mbar or from 1 mbar to 40 mbar, respectively. In a seventh variant, the pressure measured at the first measurement position is in the range from 0.1 mbar to 40 mbar, while the pressure at the second measurement position is in the range from 0.1 mbar to 100 mbar, from 1 mbar to 100 mbar, from 0.1 mbar to 50 mbar, from 1 mbar to 50 mbar, from 0.1 mbar to 40 mbar or from 1 mbar to 40 mbar, respectively. In an eighth variant, the pressure measured at the first measurement position is in the range from 1 mbar to 40 mbar, while the pressure at the second measurement position is in the range from 0.1 mbar to 100 mbar, from 1 mbar to 100 mbar, from 0.1 mbar to 50 mbar, from 1 mbar to 50 mbar, from 0.1 mbar to 40 mbar or from 1 mbar to 40 mbar, respectively.

In the inside of the reduced pressure chamber 61, a laser beam of the laser 62 is focused to a spot within the focus region. In this example of FIG. 3, this spot is distanced by 2 cm from the inlet 56. In variations however, this spot is distanced by more than 2 cm or by less than 2 cm from the inlet 56. Independent of the precise distance of the spot from the inlet 56, the parameters of the laser 62 are optimised to induce a plasma in the argon of the dispersion which is inserted via the flow restricting device 60 into the reduced pressure chamber 61. Thus, an argon plasma is generated and maintained in a plasma region 63 around the spot of the laser beam. Due to this argon plasma, the aerosol particles entering the plasma region 63 are atomised and ionised to elemental ions and possible ionised metal oxides.

In the present example, where the ion source 50 comprises the gas exchange device 52 which substitutes argon for the air in the dispersion, possible metal atoms comprised in the aerosol particles are rather unlikely to become oxidised to ionised metal oxides. Thus, for simplicity reasons, in the following, the explanations are limited to the case of elemental ions. Nonetheless, in case the aerosol particles comprise metal atoms, at least some of these metal atoms become oxidised and ionised to ionised metal oxides. These ionised metal oxides can be separated into elemental ions of the metal as described above for example by a fragmenting device. Furthermore they can be analysed by the analysers described below in the same way as described in the summary of the invention.

In order to optimise the efficiency of the atomisation and ionisation to elemental ions, the parameters of the laser 62, the pressure in the plasma region 63 and the size of the focus region are chosen such that the plasma region 63 is larger than the focus region and that the focus region is located within the plasma region 63. Additionally, these parameters are chosen such that the plasma is steady maintained, wherein a temperature of the plasma is high, up to 10'000 K or even higher. Since the plasma is induced in the gas of the dispersion, the gas not only serves as the plasma gas but also enables a collisional cooling of the elemental ions generated from the atomised aerosol particle material.

Since the plasma region 63 can be chosen to be relatively small, a considerably smaller laser is sufficient as compared to the lasers required in ATOFMS type instruments like apparatus 601 described above in the context of FIG. 2. Thus, considerably less energy is required to power the plasma in the ion source 50 according to the invention.

There are many types of lasers known in the art which are suitable for laser 62 to generate and maintain the plasma. In an example, the laser 62 is a passive locking mode Nd:YAP laser with a wavelength of 1'078 nm with a laser pulse duration of 80 ns and a pulse frequency of 3 kHz. However, any other laser suitable for generating and maintaining the plasma can be employed. In particular, the dispersion inserted into the inside of the reduced pressure chamber 61 comprises another gas than argon, another laser may be better suited.

The elemental ions resulting from the atomised and ionised aerosol particles are transferred sequentially through the chambers 8.1, 8.2, 8.3 of the differentially pumped interface 8 to the mass analyser 5 for obtaining mass spectra from the elemental ions. In the present example, the mass analyser 5 is a time-of-flight mass analyser. It may however be any other type of mass analyser, too.

Upon detection of an ion, the mass analyser 5 provides a signal to the electronic data acquisition system 10 for processing the signals received from the mass analyser 5. This electronic data acquisition system 10 comprises at least one analogue-to-digital converter 10.1 producing digitised data from signals obtained from the mass analyser 5 and a fast processing unit 10.2 receiving the digitised data from the analogue-to-digital converter 10.1. The fast processing unit 10.2 is a field programmable gate array and is programmed to continuously, in real time inspect the digitised data for events of interest measured by the mass analyser 5. Furthermore, the electronic data acquisition system 10 is programmed to forward the digitised data representing mass spectra relating to events of interest for further analysis to a computer (not shown) and to reject the digitised data representing mass spectra not relating to events of interest. Thus, the apparatus 1 enables "event triggering". How this event triggering works in detail, is known and described in WO 2016/004542 A1 of Tofwerk AG.

The ion source 50 of apparatus 1 shown in FIG. 3 comprises a collision cell 65 as fragmenting devices for fragmentation of molecules into elements, or for removing molecules by collisions. This collision cell 65 is located downstream of the plasma region 63. Within the collision cell 65, ionised debris, in particular ionised molecules, originating from the aerosol particles are fragmented into elemental ions, wherein the collision cell 65 is fluidly coupled to the plasma region 63 in the inside of the reduced pressure chamber 61 for transferring ionised debris, in particular ionised molecules, of the aerosol particles generated in the plasma through the collision cell 65 for fragmenting the ionised debris, in particular ionised molecules, originating from the aerosol particles to elemental ions. Herein, ionised debris comprises anything ionised originating from the aerosol particles. Thus, ionised debris includes the elemental ions as well as other ionised debris like for example ionised molecules or ionised clusters of atoms which have not been atomised in the plasma.

In the second chamber 8.2 of the differentially pumped interface 8, a quadrupole ion guide 11 is arranged such that elemental ions passing the second chamber 8.2 pass through the quadrupole ion guide 11. This quadrupole ion guide 11 serves as a mass filter. It provides in its inside two superimposed electric fields. A first field is used for transporting the elemental ions from the entrance to the exit of the quadrupole ion guide 11. For this, the field direction is essentially parallel to the quadrupole ion guide 11's main axis, and the field can be static. By tuning the strength of this field, the ions can be accelerated or deaccelerated when being transferred from the entrance to the exit of the quadrupole ion guide 11. A second electric field is applied for confining the elemental ions close to the axis. This second electric field is a radio frequency (RF) quadrupole field with low amplitudes on the chamber axis and larger amplitudes away from the axis. The frequency of the RF quadrupole field is chosen to filter for a specific range of mass per charge ratios: Ions having a mass per charge ratio within the filtered range are transferred through the quadrupole ion guide 11 while ions having another mass per charge ratio are rejected. This range is selected such that elemental ions originating from the aerosol particles are transferred through the quadrupole ion guide 11, while most other ions are rejected. Furthermore, the frequency of the RF quadrupole field is chosen such that argon ions originating from the plasma gas are thrown out of the quadrupole even in case they are within the filtered range of mass per charge ratios.

The elemental ions which are passed through the quadrupole ion guide 11 are focused by the quadrupole ion guide 11 into an ion beam with a thin diameter. From the quadrupole ion guide 11, they are passed through the differentially pumped interface 8 into the mass analyser 5, where they are analysed.

In a variant, the quadrupole ion guide 11 extends into the first chamber 8.1 of the differentially pumped interface 8 around the collision cell 65 such that the plasma region in the inside of the reduced pressure chamber is created very close to, or within an ion focusing device like the quadrupole ion guide 11 in order to focus the elemental ions close to the axis after and during the collisional cooling and further atomisation of debris from the aerosol particles within the collision cell 65 mentioned above.

In a further variant, the ion source 50 comprises a test gas line (not shown) for fluidly coupling a test gas source via the denuder 64 and the flow restricting device 60 with the inside of the reduced pressure chamber 61. The test gas contains known particles with known metal content. Thus, the apparatus 1 for analysing the elemental composition of aerosol particles can be calibrated in a simple way by analysing the test gas.

In yet a further variant, the ion source 50 comprises a clean gas line (not shown) for fluidly coupling a clean gas source via the denuder 64 and the flow restricting device 60 with the inside of the reduced pressure chamber 61. This clean gas is preferably Argon or Nitrogen.

In yet a further variant, the ion source 50 may go with an acoustic lens instead of the aerodynamic lens 57.

Figure 4:
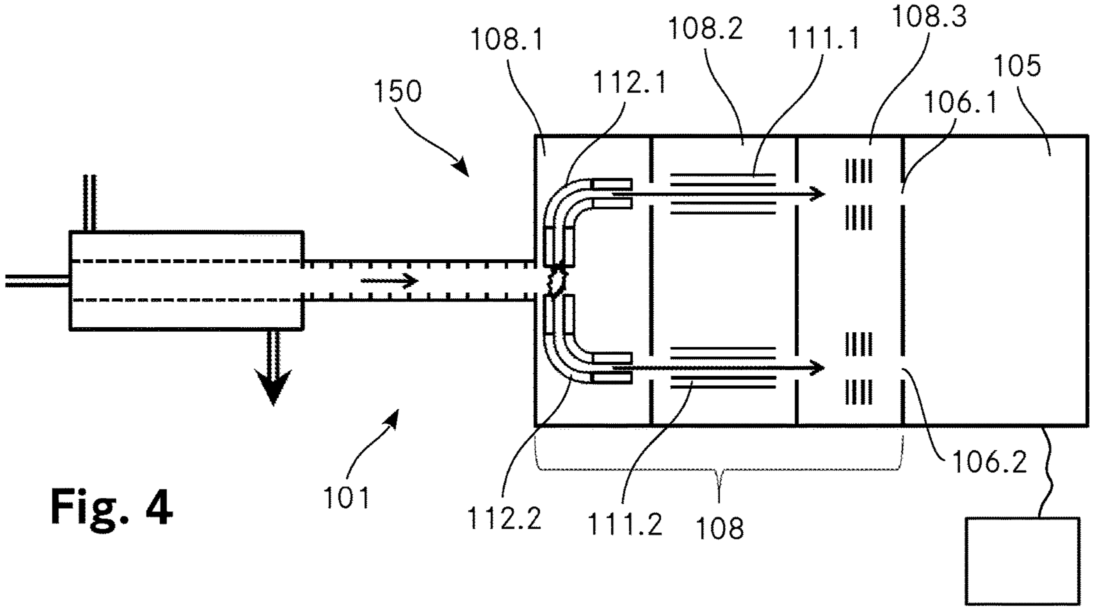

FIG. 4 shows a schematic view of another apparatus 101 for analysing an elemental composition of aerosol particles, the apparatus 101 comprising another ion source 150 according to the invention for generating elemental ions from the aerosol particles.

In the example shown in FIG. 4, the ion source 150 is constructed similar to the ion source 50 shown in FIG. 3. However, the ion source 150 of FIG. 4 does not provide a denuder and does not provide a collision cell as fragmenting device. Otherwise, the aerosol particles are treated by the ion source 150 of FIG. 4 the same as described above in the context of the ion source 50 shown in FIG. 3. Even though not shown in FIG. 4, the ion source 150 comprises as well a laser for inducing the plasma in the plasma region as the ion source 50 shown in FIG. 3 does. Thereby, the plasma is induced in the gas of the dispersion for atomising and ionising the aerosol particles to ions.

The apparatus 101 shown in FIG. 4 comprises a differentially pumped interface 108 which is somewhat different to the differentially pumped interface 8 of the apparatus 1 shown in FIG. 3. The details of these differences are described below. Furthermore, the apparatus 101 shown in FIG. 4 comprises a dual polarity mass analyser 105 instead of the mass analyser 5 of apparatus 1 shown in FIG. 3. This dual polarity mass analyser 105 comprises two mass analysers within the same mass analysing unit. It enables the analysis of negative ions and of positive ions and provides for both types of ions separate mass spectra. In order to enable the analysis of both types of ions, the mass analyser 105 provides two inlets 106.1, 106.2. One of these inlets 106.1 is for inserting negative ions into the dual polarity mass analyser 150, while the other of these inlets 106.2 is for inserting positive ions into the dual polarity mass analyser 150. Instead of this dual polarity mass analyser 105, the apparatus 101 can also comprise two separated mass analysers, wherein one is adapted for analysing negative elemental ions, while the other one is adapted for analysing positive elemental ions.

After the aerosol particles are atomised and ionised by the ion source 150 to elemental ions, the elemental ions are separated according to their polarity. Negative elemental ions are transferred into a first bent quadrupole ion guide 112.1, while positive elemental ions are transferred into a second bent quadrupole ion guide 112.2. These two bent quadrupole ion guides 112.1 are both arranged in the first chamber 108.1 of the differentially pumped interface 108 and direct the negative and positive elemental ions, respectively, in opposite directions away from the plasma region to separate orifices to the second chamber 108.2 of the differentially pumped interface 108. Thereby, the negative and positive elemental ions are transferred away from the plasma region in directions different to a direction in which the aerosol particles enter the plasma region. Both the first bent quadrupole ion guide 112.1 and the second bent quadrupole ion guide 112.2 are each adapted for holding two superimposed electric fields, wherein a first electric field of the two superimposed electric fields is a static electric field and wherein a second field of the two superimposed electric fields is a RF multipole field with low amplitudes on an axis of the multipole ion guide and larger amplitudes away from the axis. Furthermore, for both the first bent quadrupole ion guide 112.1 and the second bent quadrupole ion guide 112.2, a strength of the respective first electric field is tuneable.

After being transferred into the second chamber 108.2, the negative and positive elemental ions are filtered by a first quadrupole ion guide 111.1 and second quadrupole ion guide 111.2, respectively, as described for the quadrupole ion guide 11 shown in FIG. 3. Subsequently, the negative and positive elemental ions are passed through the third chamber 108.3 of the differentially pumped interface 108 into their respective inlet 106.1, 106.2 of the dual polarity mass analyser 105, where they are analysed. Thereby, a pressure in the dual polarity mass analyser 105 is less than 0.0001 mbar. In a variant however, the pressure in the dual polarity mass analyser 105 is less than 0.00001 mbar.

Figure 5:
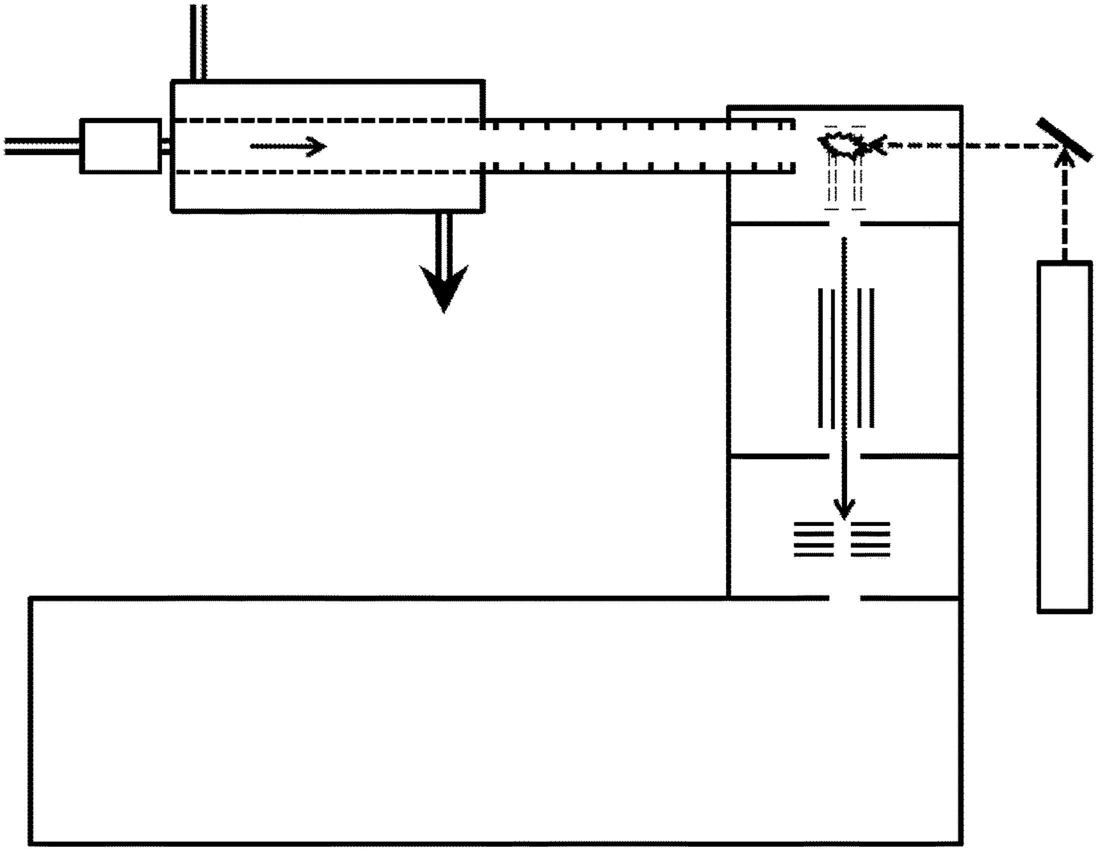

FIG. 5 shows a schematic view of a more space saving configuration of the apparatus 101 shown in FIG. 4. Here, the differential pumping interfaces and the mass analysers of the two polarities are arranged behind each other.

Figure 6:
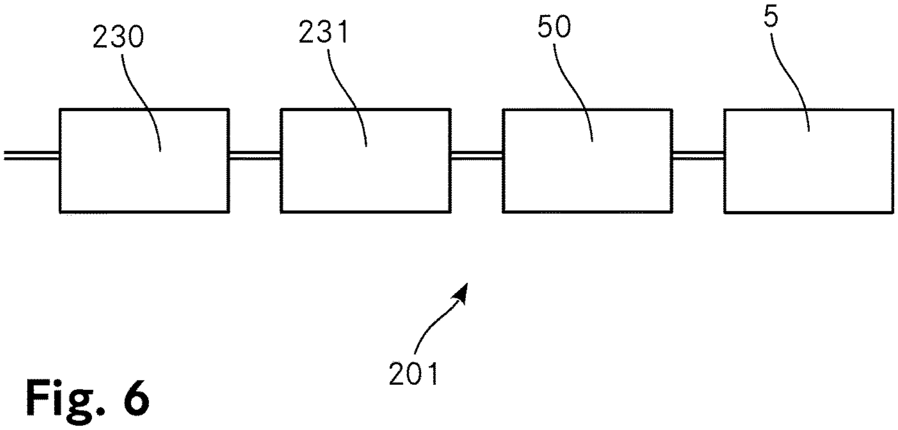

FIG. 6 shows a schematic view with reduced details of a modified apparatus 201 for analysing the elemental composition of aerosol particles. This apparatus comprises 201 an aerosol particle ionisation source 230 for ionising the aerosol particles and an ionised aerosol particle mobility analyser 231 for separating ionised aerosol particles according to their mobility. The aerosol particle ionisation source 230 is adapted for ionising aerosol particles without atomising and even without fragmenting the aerosol particles. Furthermore, the ionised aerosol particle mobility analyser 231 can be any ion mobility analyser suitable for analysing the mobility of ionised aerosol particles. In the apparatus 201, the aerosol particle ionisation source 230 and the aerosol particle mobility analyser 231 are arranged upstream of the ion source 50. Thus, the aerosol particles inserted into the apparatus 201 are first ionised by the aerosol particle ionisation source 230 and then separated according to their mobility by the aerosol particle mobility analyser 23. Subsequently, the aerosol particles are atomised and ionised to elemental ions by ion source 50 and the resulting elemental ions are forwarded to detector 5 for being analysed.

With apparatus 201, the mobility of the aerosol particles can be determined which provides information on the size and cross section of the aerosol particles. Furthermore, with apparatus 201, the aerosol particles are separated according to their mobility when reaching the ion source 50. Thus, analysis of the elemental ions from the aerosol particles can be achieved in single aerosol particle mode where the elemental ions originating from a specific aerosol particle are knowingly analysed as originating from one and the same specific aerosol particle. In order to facilitate this single aerosol particle mode, the above described event triggering can be employed. However, the ion source 50 can also be modified to comprise an aerosol particle detection unit which detects an aerosol particle when entering the plasma region. This aerosol particle detection unit can for example be an optical unit. Furthermore, the ion source 50 can also comprise a control unit. With this control unit, the laser of ion source 50 can be triggered upon detection of an aerosol particle to induce the plasma in the plasma region for atomising and ionising the aerosol particle. Furthermore, with the control unit, the mass analyser 5 can be triggered to analyse the elemental ions originating from the respective aerosol particles. Thus, the laser of the ion source 50 and the mass analyser 5 can be synchronised by the control unit.

In a variant, the aerosol particle ionisation source and the ionised aerosol particle mobility analyser may be arranged within ion source 50. For example, they may be arranged between the gas exchange unit and the flow restricting device.

The invention is not limited to the embodiments described above. Various variations of the described embodiments are possible besides the variants which are already described above.

In summary, it is to be noted that an ion source and a method for generating elemental ions from aerosol particles is created which is suitable for an apparatus and a method for analysing the elemental composition of aerosol particles pertaining to the technical field initially mentioned that enables precise and reliable analysis of the elemental composition of aerosol particles and which can be employed for different types of analysis of the elemental composition of aerosol particles, like for example on-line and real-time analysis in monitoring applications or field applications.

The invention claimed is:

1. An ion source for generating elemental ions and possible ionised metal oxides from aerosol particles, comprising:

a) a reduced pressure chamber having an inside;

b) an inlet and a flow restricting device for inserting said aerosol particles in a dispersion comprising said aerosol particles dispersed in a gas, in particular in air, into said inside of said reduced pressure chamber, said inlet fluidly coupling an outside of said reduced pressure chamber via said flow restricting device with said inside of said reduced pressure chamber;

c) a laser for inducing in a plasma region in said inside of said reduced pressure chamber a plasma in said dispersion for atomising and ionising said aerosol particles to elemental ions and possible ionised metal oxides, wherein said laser is adapted for inducing in said plasma region in said inside of said reduced pressure chamber said plasma in said gas of said dispersion for atomising and ionising said aerosol particles to elemental ions;

wherein said reduced pressure chamber is adapted for achieving and maintaining in said inside of said reduced pressure chamber a pressure in a range from 0.01 mbar to 100 mbar, preferably from 0.1 mbar to 100 mbar or from 1 mbar to 100 mbar, particular preferably from 0.1 mbar to 50 mbar or from 1 mbar to 50 mbar, most preferably from 0.1 mbar to 40 mbar or from 1 mbar to 40 mbar.

2. The ion source according to claim 1, wherein said ion source comprises a denuder for removing contaminations in said dispersion, said denuder fluidly coupling said inlet with said flow restricting device for inserting said dispersion through said denuder and subsequently through said flow restricting device into said inside of said reduced pressure chamber.

3. The ion source according to claim 1, wherein said ion source comprises a gas exchange device for exchanging said gas, in particular said air, in said dispersion by a clean plasma gas before inserting said dispersion comprising said aerosol particles into said inside of said reduced pressure chamber.

4. The ion source according to claim 1, wherein said ion source comprises an aerodynamic lens or an acoustic lens for focussing said aerosol particles to a focus region in said inside of said reduced pressure chamber.

5. The ion source according to claim 1, wherein said ion source comprises a fragmenting device, in particular a collision cell, for fragmenting ionised debris, in particular ionised molecules, originating from said aerosol particles, and possible ionised metal oxides, wherein the metal originates from the aerosol particles, into elemental ions, wherein said fragmenting device is fluidly coupled to said plasma region in said inside of said reduced pressure chamber for transferring ionised debris, in particular ionised molecules and possible ionised metal oxides, of said aerosol particles generated in said plasma through the fragmenting device for fragmenting said ionised debris, in particular ionised molecules, originating from said aerosol particles, and possible ionised metal oxides, wherein the metal originates from the aerosol particles, into elemental ions.

6. An apparatus for analysing an elemental composition of aerosol particles, comprising:

a) an ion source according to claim 1; and b) a first mass analyser for analysing said elemental ions and possible ionised metal oxides, wherein said inside of said reduced pressure chamber is fluidly coupled with said first mass analyser.

7. The apparatus according to claim 6, wherein said apparatus comprises a differentially pumped interface comprising at least one differentially pumped stage, preferably at least two differentially pumped stages, particular preferably at least three differentially pumped stages, said differentially pumped interface fluidly coupling said inside of said reduced pressure chamber with said first mass analyser for transferring said elemental ions and possible ionised metal oxides from said reduced pressure chamber to said first mass analyser.

8. The apparatus according to claim 6, wherein said apparatus comprises a multipole ion guide, in particular a quadrupole ion guide, for resonant excitation of said elemental ions and possible ionised metal oxides, said multipole ion guide fluidly coupling said inside of said reduced pressure chamber with said first mass analyser for transferring said elemental ions and possible ionised metal oxides from said reduced pressure chamber to said first mass analyser.

9. The apparatus according to claim 6, wherein said apparatus comprises a second mass analyser for analysing said elemental ions and possible ionised metal oxides, wherein said inside of said reduced pressure chamber is fluidly coupled with said second mass analyser for transferring said elemental ions and possible ionised metal oxides from said reduced pressure chamber to said second mass analyser.

10. The apparatus according to claim 9, wherein said first mass analyser is adapted for analysing positive ions and said second mass analyser is adapted for analysing negative ions.

11. The apparatus according to claim 6, wherein said apparatus comprises an ionised aerosol particle mobility analyser for separating ionised aerosol particles according to their mobility, wherein said ionised aerosol particle mobility analyser is fluidly coupled with said inlet of said ion source for inserting said dispersion comprising said aerosol particles via said aerosol particle mobility analyser to said ion source.

12. The apparatus according to claim 6, wherein said apparatus further comprises an electronic data acquisition system for processing signals provided by said first mass analyser, whereas said electronic data acquisition system comprises a) at least one analogue-to-digital converter producing digitised data from said signals obtained from said first mass analyser;

b) a fast processing unit receiving said digitised data from said analogue-to-digital converter;

wherein c) said fast processing unit is programmed to continuously, in real time inspect said digitised data for events of interest measured by said first mass analyser; and d) said electronic data acquisition system is programmed to forward said digitised data representing mass spectra relating to events of interest for further analysis and to reject said digitized data representing mass spectra not relating to events of interest.

13. The apparatus according to claim 6, wherein said apparatus further comprises an aerosol particle detection unit for detecting aerosol particles when they enter said plasma region, and a control unit for synchronising said laser and said first mass analyser with said aerosol particle detection unit in order to enable single aerosol particle analysis.

14. A method for generating elemental ions from aerosol particles, comprising the steps of:

a) inserting aerosol particles in a dispersion comprising said aerosol particles dispersed in a gas, in particular in air, through an inlet via a flow restricting device into an inside of a reduced pressure chamber, while maintaining in said inside of said reduced pressure chamber a pressure in a range from 0.01 mbar to 100 mbar, preferably from 0.1 mbar to 100 mbar or from 1 mbar to 100 mbar, particular preferably from 0.1 mbar to 50 mbar or from 1 mbar to 50 mbar, most preferably from 0.1 mbar to 40 mbar or from 1 mbar to 40 mbar; and b) inducing with a laser in a plasma region in said inside of said reduced pressure chamber a plasma in said dispersion for atomising and ionising said aerosol particles to elemental ions and possible ionised metal oxides, wherein said laser is adapted for inducing in said plasma region in said inside of said reduced pressure chamber said plasma in said gas of said dispersion for atomising and ionising said aerosol particles to elemental ions.

15. A method for analysing an elemental composition of aerosol particles, comprising the steps of:

a) generating elemental ions and/or ionised metal oxides from aerosol particles with the method according to claim 14, b) transferring said elemental ions and/or ionised metal oxides to a first mass analyser and c) analysing said elemental ions and/or ionised metal oxides with said first mass analyser.

* * * * *